United States Patent [19]
Harano et al.

[11] Patent Number: 5,510,428
[45] Date of Patent: Apr. 23, 1996

[54] COMPOSITIONS, EPOXIZED COMPOSITIONS, A HEAT CURABLE RESIN COMPOSITION, AN EPOXY RESIN COMPOSITION, RADICALLY POLYMERIZED COMPOSITIONS, A CURABLE RESIN COMPOSITION AND A POLYMER HAVING EPOXY GROUPS

[75] Inventors: Yoshiyuki Harano; Sozo Namai; Katsuyuki Maeda; Takaaki Murai, all of Otake, Japan

[73] Assignee: Daicel Chemical Industries, Ltd., Tokyo, Japan

[21] Appl. No.: 342,633

[22] Filed: Nov. 21, 1994

Related U.S. Application Data

[60] Continuation of Ser. No. 90,769, Jul. 13, 1993, abandoned, which is a division of Ser. No. 968,380, Oct. 29, 1992, abandoned.

[30] Foreign Application Priority Data

| Oct. 31, 1991 | [JP] | Japan | 3-286444 |
| Nov. 15, 1991 | [JP] | Japan | 3-300369 |
| Apr. 6, 1992 | [JP] | Japan | 4-83739 |
| May 11, 1992 | [JP] | Japan | 4-117296 |
| Jun. 19, 1992 | [JP] | Japan | 4-161032 |
| Jun. 19, 1992 | [JP] | Japan | 4-161033 |
| Jul. 14, 1992 | [JP] | Japan | 4-187086 |
| Jul. 21, 1992 | [JP] | Japan | 4-193870 |
| Sep. 3, 1992 | [JP] | Japan | 4-235676 |
| Sep. 4, 1992 | [JP] | Japan | 4-237231 |
| Sep. 11, 1992 | [JP] | Japan | 4-243466 |
| Sep. 22, 1992 | [JP] | Japan | 4-251549 |
| Oct. 2, 1992 | [JP] | Japan | 4-264592 |

[51] Int. Cl.$^6$ ............ C08F 20/00; C07D 301/14
[52] U.S. Cl. ............ 525/438; 525/451; 525/529; 525/922; 528/103; 528/112; 528/166; 549/512; 549/513; 549/523; 549/525; 549/526
[58] Field of Search ............ 549/512, 513, 549/518, 523, 525, 526; 528/103, 112, 166; 525/438, 922, 529, 451

[56] References Cited

U.S. PATENT DOCUMENTS

| 4,293,672 | 10/1981 | Jackson | 525/531 |
| 4,355,071 | 10/1982 | Chang | 525/293 |
| 4,719,268 | 1/1988 | Hefner, Jr. et al. | 525/922 |
| 5,140,091 | 8/1992 | Sakai et al. | 525/529 |

*Primary Examiner*—Thomas Hamilton, III
*Assistant Examiner*—Randy Gulakowski
*Attorney, Agent, or Firm*—Morgan & Finnegan

[57] ABSTRACT

Compositions (I), (II) and (III) comprising compounds having vinyl groups as side chains and epoxidized compositions (XI), (XII) and (XIII) thereof, which can be prepared by the various reaction combinations of (a) with (b) or (b)+(c), and or (d), where (a) is at least one compound having at least one vinyl group and one epoxy group in the molecule; (b) is at least one of a polybasic compound, an anhydride thereof, a polymer having carboxylic groups at terminals and a polymer having carboxylic groups as side chains; (c) is at least one organic compound having at least one active hydrogen atom; and (d) is at east one of an unsaturated monocarboxylic compound or an unsaturated monocarboxylic ester having a hydroxyl group.

18 Claims, No Drawings

COMPOSITIONS, EPOXIZED COMPOSITIONS, A HEAT CURABLE RESIN COMPOSITION, AN EPOXY RESIN COMPOSITION, RADICALLY POLYMERIZED COMPOSITIONS, A CURABLE RESIN COMPOSITION AND A POLYMER HAVING EPOXY GROUPS

This is a continuation of application Ser. No. 08/090,769 filed Jul. 13, 1993 now abandoned which is a divisional of Ser. No. 07/968,380, filed Oct. 29, 1992 now abandoned.

FIELD OF THE INVENTION

The present invention relates to novel compositions comprising a compound having vinyl groups as side chains and epoxidized compositions thereof.

Furthermore, the present invention also relates to heat curable resin compositions which comprise the above-mentioned compositions and a radical initiator, aim epoxy resin composition and a curing agent.

Still further, the present invention relates to another compositions comprising compounds having vinyl groups as side chains, epoxidized compositions thereof, radically polymerized compositions, curable resin compositions prepared by the epoxidized compositions, and a polymer having epoxy groups.

BACKGROUND OF THE INVENTION

Epoxy resins which have been widely used industrially include the so-called epi-bis type epoxy resins which are produced by reacting bisphenol A with epichlorohydrin.

These resins have advantages, e.g., various products can be obtained, which can vary from liquid to solid state, and they can be cured at room temperatures with polyamines because of the high reactivity of the epoxy resins.

However, cured products thereof are defective in that outdoor durability is poor; electric properties such as anti-tracking property, etc., are poor; and the heat distortion temperature is low, although they do have desirable the characteristics of good water resistance and strength, Recently, epoxy resins prepared by reacting a phenolic resin or a novolak resin with epichlorohydrin have been used as resins for encapsulating VLSI(very large scale integrated circuit), a light emitting or receiving device, etc.

But, chlorine contained in the resins, typically in an amount of several hundreds ppm, causes the problem of a deterioration of the electric properties of such electronic devices.

Epoxy resins having excellent electric properties and heat resistance, and which do not contain chlorine are known. These include certain alicyclic epoxy resins which are produced by an epoxidation reaction of a compound having a 5-membered or 6-membered cycloalkenyl structure.

The epoxy group in these resins is a so-called inner epoxy group, and curing is usually carried out with acid anhydride by heating.

However, since their reactivity is low, they cannot be cured with polyamines at room temperature, and therefore, the use of the alicyclic epoxy resins has so far been technically restricted.

As alicyclic epoxy resins, those having a structure represented by formula (X-I) or (X-II) are presently used commercially.

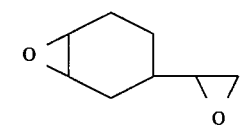

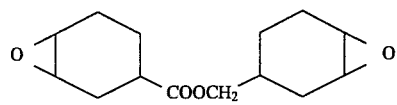

(X-I) is used as a heat resistant epoxy diluent, because of its very low viscosity.

However, it has the disadvantage of possessing high toxicity and causes the problem of poisoning upon contact with the skin of the human body. (X-II) contains only a small amount of impurities and has a low color hue, and the cured products produced therewith have a high heat distortion temperature.

However, many epoxy resins suffer from the problem of poor water resistance due to the presence of ester bonds.

In addition, because epoxy resins (X-I) and (X-II) have low viscosity, it is impossible to apply molding systems for solid epoxy resins, such as transfer molding, etc., thereto.

From the above viewpoint, novel alicyclic epoxy resins having oxycyclohexane units and ether bonds were taught in Japanese Patent Examined Publication (Kokoku) Nos. 31493/1989, 10471/1992 (equivalent to U.S. Pat. No. 4,565, 859).

However, the above epoxy resins have lower softening temperatures.

In addition, not only the overcoming of the above described problems, but also the number of methods or objects involving the use of epoxy resins have grown, and so have the desired characteristics of such epoxy resins; for example, a demand for epoxy resins having excellent various properties has increased.

From the above viewpoint, and as a result of intensive studies by the present inventors, it was found that softening temperatures of epoxy resins can be readily adjusted in a wide range by incorporating ester units in place of ether units into main chain of the molecule.

Furthermore, unsaturated carboxylic esters having vinyl groups are useful as, for example, curing agents for an acrylic rubber.

Allyl methacrylate is known as a typical unsaturated carboxylic ester having vinyl groups.

However, in the case that allyl methacrylate is used as a curing agent for an acrylic rubber, there is a tendency of easy gelation to because of its high reactivity.

On the other hand, glycidyl (meth)acrylate and 3,4-epoxycyclohexylmethyl (meth)acrylate are known as an unsaturated carboxylic ester having epoxy groups.

Recently in particular, it has been taught that 3,4-epoxycyclohexylmethyl (meth)acrylate can be used as a coating composition to be cured by a cationic curing reaction, for example, in Japanese Patent Unexamined Publication (Kokai) Nos.108048/1988, 108049/1988(equivalent to U.S. Pat. No. 4,772,672), (Kokai) Nos.123814/1989, 123817/1989(equivalent to U.S. Pat. No. 4,923,945), (Kokai) Nos.129018/1989, 129019/1989(equivalent to U.S. Pat. No. 4,927,884), etc.

However, the reaction control is difficult because 3,4epoxycyclohexylmethyl (meth)acrylate has an epoxy group directly bonded to the cyclohexane ring resulting in high reactivity with the cationic curing agent.

In the above-mentioned prior arts, the problem is solved by using a macromonomer in which 3,4-epoxycyclohexylmethyl (meth)acrylate is radically polymerized with a monomer having silicone atoms, etc.

On the other hand, glycidyl (meth)acrylate often shows a too low reactivity even by combination with various curing agents.

Furthermore, glycidyl (meth)acrylate includes chlorine because of the use of epichlorohydrin as a starting material, whereby cured articles or coating layers therefrom have a tendency of being adversely affected.

From the above viewpoint, and as a result of intensive studies by the present inventors, it was found that the problem can be solved by an unsaturated carboxylic ester or ether composition having epoxy groups.

SUMMARY OF THE INVENTION

An object of the present invention is to provide novel compositions comprising compounds having vinyl groups as a side chains and epoxidized compositions thereof. These novel compositions are useful as powder coating compositions, radically polymerized compositions, epoxy resin compositions, compositions for encapsulating, compositions for solder resist inks and (photo)curable compositions.

The present, compositions can be prepared by a reaction of (a) with (b), by a reaction of (b) and (c) with (a) described below, and by an epoxidation reaction thereof; wherein (a) is a compound having at least one vinyl group and one epoxy group in the molecule;

(b) is at least one of a polybasic compound, an anhydride thereof, a polymer having carboxylic groups at terminal portions and a polymer having carboxylic groups as side chains; is at least one organic compound having at least one active hydrogen (c) is at least one organic compound having at least one active hydrogen atom.

The present epoxy compositions provide excellent properties of being adjustable in softening temperatures in coating layers, etc.

Another object of the present invention is to provide an another composition comprising compounds having vinyl groups as side chains and epoxidized composition thereof, which are useful as an unsaturated monomer radically polymerized compositions and a curable resin composition, The compositions can be prepared by a reaction of (a) with (d) described below, and by an epoxidation reaction thereof; wherein (a) is a compound having at least one vinyl group and one epoxy group in the molecule;

(d) is at least one of an unsaturated monocarboxylic compound or an unsaturated monocarboxylic ester having a hydroxyl group.

The composition comprising compounds having vinyl groups as side chains is useful as an unsaturated monomer which is capable of copolymerizing with other monomers.

Furthermore, the epoxidized composition is useful for a curable resin composition, inks, various coatings and insulating varnishes, etc.

DETAILED DESCRIPTION OF THE INVENTION

The present invention is described hereinafter in more detail.

According to a first aspect of the present invention, there is provided a composition (I) comprising compounds having vinyl groups as side chains.

The composition (I) comprising a compound having vinyl groups as side chains can be obtained by the reaction of (a) with (b) ; wherein (a) is a compound having at least one vinyl group and one epoxy group in the molecule (b) is at least one of a polybasic compound, an anhydride thereof, a polymer having carboxylic groups at terminal portions and a polymer having carboxylic groups as side chains.

According to a second aspect of the present invention, there is provided another composition (II) comprising compounds having vinyl groups as side chains.

The composition (II) comprising a compound having vinyl groups as side chains can be obtained by reacting (c) with (b), and subsequently with (a), or by a simultaneous reaction of (c), (b) and (a) ; wherein (a) is a compound having at least one vinyl group and one epoxy group in the molecule (b) is at least one of a polybasic compound, an anhydride thereof, a polymer having carboxylic groups at terminals and a polymer having carboxylic groups as side chains (c) is at least one organic compound having at least one active hydrogen atom.

According to a third aspect of the present invention, there is provided other composition (III) comprising compounds having vinyl groups as side chains.

The composition (III) comprising compounds having vinyl groups as side chains can be obtained by a reaction of (a) with (d); wherein (a) is a compound having at least one vinyl group and one epoxy group in the molecule (d) is at least one of an unsaturated monocarboxylic compound or an unsaturated monocarboxylic ester having a hydroxyl group.

The compound(a) having at least one vinyl group and one epoxy group in the molecule, which is a common starting material in the first, second and third aspects of the present invention, can be mainly represented by general chemical formula described below;

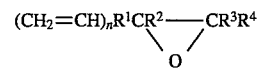

<wherein, n is an integer of from 1 to 5, $R^1$ and $R^2$ are a hydrogen atom or an alkyl group or substituted phenyl group having carbon numbers of from 1 to 5, $R^2$ and $R^3$ are a hydrogen atom or an alkyl group having carbon numbers of from 1 to 50, and $R^2$ and $R^3$ may be taken together to form a ring structure>.

Specific illustrative examples of the compound(a) include 4-vinylcyclohexene-1-oxide,5-vinylbicyclo[2.2.1]hepto-2-en-2-oxide,limonene monoxide, trivinylcyclohexane monoxide, divinylbenzene monoxide, butadiene monoxide and 2-epoxy-9-decene.

Furthermore, allylglycidylether which is represented by general formula described below;

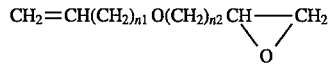

in which n1 and n2 are an integer of from 0 to 380, respectively, glycidylstyryl ether which is represented by general formula as described below;

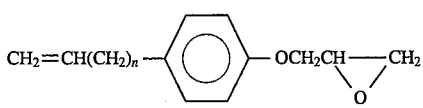

in which n is an integer of from 0 to 30, are also included.

Still further, the following compounds;

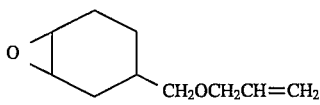

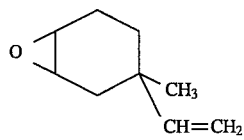

in which n is an integer of from 0 to 30,

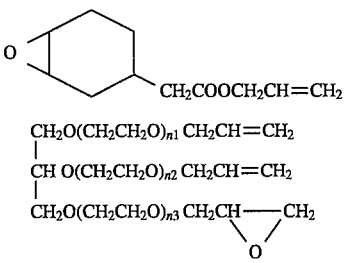

in which n1, n2 and n3 are an integer of from 0 to 30, respectively, n1+n2+n3 is an integer of from 1 to 30, can be also used as a compound(a) having at least one vinyl group and one epoxy group in the molecule.

One or more of the above-mentioned compounds(a) can be used.

It is noted that there can be additionally used a monoepoxide such as ethylene oxide, propylene oxide, cyclohexeneoxide, styrene oxide, alphaolefin epoxide, etc. and or a diepoxide such as vinylcyclohexenediepoxide, 3,4-epoxycyclohexylmethyl-3,4-epoxycyclohexanecarboxylate, etc., together with the compound(a) having at least one vinyl group and one epoxy group in the molecule.

Successively, the compound(b) which is also a common starting material in the first and second aspects of the present invention, is described below.

The compound(b) includes a polybasic compound or an anhydride thereof, a polymer having carboxylic groups at terminal portions and a polymer having carboxylic groups as side chains.

Polybasic compounds or anhydrides thereof include aliphatic or aromatic polybasic compounds and anhydrides thereof.

Aromatic polybasic compounds and anhydrides thereof include, for example, phthalic anhydride, isophthalic acid, terephthalic acid and trimellitic anhydride.

Aliphatic polybasic compounds and anhydrides thereof include, for example, tetrahydrophthalic acid, 4-methylhexahydrophthalic acid, hexahydrophthalic acid, adipic acid, maleic acid and anhydrides thereof, fumaric acid, sebacic acid and dodecanoic acid, etc.

Polymers having carboxylic groups at terminal portions include a polyether or polyester compound having carboxylic groups at terminal portions prepared by a reaction of a polybasic acid with, for example, a polyethyleneglycol, polypropyleneglycol, a polytetramethyleneglycol, a polybutyleneglycol, a polycyclohexeneglycol and a polyvinylcyclohexene glycol, a polybutadiene having carboxylic group at terminal positions and a polycaprolactone having carboxylic groups at terminal positions.

Polymers having carboxylic groups as side chains include, for example, acrylic (co)polymers.

One or more of the compound(b) can be used.

Successively, the compound(c) is described below.

The compound(c) which is at least one organic compound having at least one active hydrogen atom, and which is a starting material in only the second aspect of the present invention, includes alcohols, phenols, carboxylic acids, amines and thiols, a polymer having hydroxyl groups at terminal positions and a polymer having hydroxyl groups as side chains.

As alcohols, either monohydric alcohols or polyhydric alcohols may be used. For instance, aliphatic alcohols such as methanol, ethanol, propanol, butanol, pentanol, hexanol, octanol; aromatic alcohols such as benzyl alcohol; polyhydric alcohols such as ethylene glycol, diethylene glycol, triethylene glycol, polyethylene glycol, propylene glycol, dipropylene glycol, 1,3-butanediol, 1,4-butanediol, butanetriol, pentanediol, 1,6-hexanediol, neopentyl glycol, neopentyl glycol oxypivalate, cyclohexanedimethanol, glycerine, diglycerine, polyglycerine, trimethylolpropane, trimethylol ethane, pentaerythritol, dipentaerythritol, a hydrogenated bisphenol A, a hydrogenated bisphenol F, a hydrogenated bisphenol S, etc., are included.

Phenols include phenol, cresol, catechol, pyrogallol, hydroquinone, hydroquinone monomethylether, bisphenol A, bisphenol F, 4,4'-dihydroxybenzophenone, bisphenol S, an adduct of ethyleneoxide to bisphenol A, an adduct of propyleneoxide to bisphenol A, phenol resins, cresol novolak resins, etc.

A polymer having hydroxyl groups at terminal positions includes polyvinyl alcohol, partially hydrolyzed products of polyvinyl acetate, starch, cellulose, cellulose acetate, cellulose acetate butylate, hydroxyethyl cellulose, acrylic polyol resins, styrene-allyl alcohol copolymer resins, styrene-maleic acid copolymer resins, alkyd resins, polyester polyol resins, polyester carboxylic acid resins, polycaprolactone polyol resins, polypropylene polyol, polytetramethylene glycol, polycarbonatepolyols, and a polybutadiene having hydroxyl groups, cellulose polymers such as hydroxylethyl celluloses, cellulose acetates, etc.

A polymer having hydroxyl groups as side chains includes an acrylic (co)polymer having hydroxyl groups.

Carboxylic acids include formic acid, acetic acid, propionic acid, butyric acid, fatty acids of animal and vegetable oil and fats, fumaric acid, maleic acid, adipic acid, dodecanedioic acid, trimellitic acid, pyromellitic acid, polyacrylic acid, phthalic acid, isophthalic acid, terephthalic acid, etc.

In addition, compounds having a hydroxyl group together with a carboxylic acid group such as lactic acid, citric acid, oxycaproic acid, are included.

Amines include monomethylamine, dimethylamine, monoethylamine, diethylamine, propylamine, monobutylamine, dibutylamine, pentylamine, hexylamine, cyclohexylamine, octylamine, dodecylamine, 4,4'-diaminodiphenylmethane, isophorondiamine, toluenediamine, hexamethylene diamine, xylene diamine, diethylene triamine, triethylene tetramine, ethanolamine, etc.

Thiols include mercaptans such as methyl mercaptan, ethyl mercaptan, propyl mercaptan, phenylmercaptan, etc., mercaptopropioic acid or polyhydric alcohol esters of mercaptopropioic acid, such as ethylene glycol bismercapto propionate, trimethylolpropane trimercapto propionate, pentaerythritol pentamercaptopropioic acid, etc.

Still further, the compounds having at least one active hydrogen atom may have an unsaturated double bond in their structure, examples of which include allyl alcohol, acrylic acid, methacrylic acid, 2-hydroxyethyl(meth)acrylate, 3-cyclohexenemethanol, tetrahydrophthalic acid, etc.

One or more of such compounds having active hydrogen atoms can be used.

And successively, the compound(d) which is a starting material in only the third aspect of the present invention, is described below.

The compound(d) is at least one selected from the group consisting of an unsaturated monocarboxylic compound or an unsaturated monocarboxylic ester having a hydroxyl group.

The specific examples of the compound(d) include acrylic acid, methacrylic acid, 2-hydroxyethyl(meth)acrylate, 2-hydroxypropyl(meth) acrylate, 2-hydroxybutyl(meth)acrylate, 2-hydroxyethyl(meth)acrylate modified by epsilon-caprolactone, 4-hydroxybutyl(meth)acrylate modified by epsilon-caprolactone.

It is noted that although acrylic acid, methacrylic acid, 2-hydroxyethyl(meth)acrylate are included in the above-mentioned compound(c) as a compound having at least one active hydrogen atom, these compounds have a different role in compound(d).

The composition(I) comprising compounds having vinyl groups as side chains in the, first aspect of the present invention can be prepared by the following process.

The process is a ring opening reaction of an epoxy ring with carboxylic groups, resulting in an accompanying esterification reaction between residual carboxylic groups and hydroxyl groups derived from the ring opening reaction of an epoxy ring.

In the process, the compound(a) is allowed to react with the compound(b) in the mixing ratio of (a) with respect to (b) of generally from 0.4 to 5.0 by mol, preferably, from 0.5 to 3.0 by mol.

Where the mixing ratio of the compound(a) is less than 0.4, the amount of vinyl groups in the composition comprising a compound having vinyl groups as side chains becomes lower, resulting in the relative increase of carboxylic group at terminal positions and resulting in unreacted compound(b) partially remaining.

Where the mixing ratio of the compound(a) is more than 5.0, the relative amount of hydroxyl group at terminal positions increases, resulting in unreacted compound(a) partially remaining.

In the ring opening reaction of epoxy ring with carboxylic groups, a catalyst may be used in order to promote the ring opening reaction.

Catalysts include tertiary amines such as dimethyl benzylamine, triethylamine, tetramethyl ethylenediamine, tri-n-octylamine, quaternary ammonium salts such as tetramethyl ammonium chloride, tetramethyl ammonium bromide, tetrabutyl ammonium bromide, alkyl ureas such as tetramethyl urea and alkyl guanidine such as tetramethyl guanidine, etc.

One or more of the catalysts may be used.

These catalysts are used in the concentration of generally from 0.1 to 5.0% by weight, and preferably from 0.5 to 3.0%, based on the weight of the compound(a).

The reaction can be carried out at the temperature of from 50° to 200° C., preferably from 100° to 180° C.

The second aspect of the invention includes a two step reaction in which the compound(b) is first allowed to react with the compound(c) to prepare a compound having carboxyl groups at terminal positions and then the compound having carboxyl groups at terminal positions is allowed to react with the compound(a), and or one step reaction by a simultaneous addition of (c), (b) and (a).

The above-mentioned two step reaction includes a ring opening reaction of epoxy ring with carboxylic groups, resulting in an accompanying esterification reaction between residual carboxylic groups and hydroxyl groups derived from the ring opening reaction of an epoxy ring.

In the above-mentioned two step reaction, 20–70 parts of carboxylic group in the compound(b) is preferably allowed to react with 80–30 parts of active hydrogen atom in the compound(c) in order to prepare the compound having carboxylic groups at terminal positions.

Successively, the compound having carboxylic groups at terminal positions is allowed to react with the compound(a) at mixing ratio of the compound(a) with respect to the compound having carboxylic groups at terminal positions of generally from 0.4 to 5.0 by mol, preferably, from 0.5 to 3.0 by mol.

In the above-mentioned one step reaction, catalyst may preferably be used. Examples of catalysts include tin compounds such as stannous octylate or dibutyl tin laurate or titanium compounds such as tetrabutyltitanate. These catalysts are used in the concentration of generally from 10 ppm to 1000 ppm, and preferably from 50 to 500 ppm, based on the total weight of the starting compounds.

The reaction can be carried out at the temperature of from 180° to 240° C. One or more of the catalysts may be used. In the one step reaction, the compound(c) may be allowed to react with together with (a) and (b) in the mixing ratio as described hereinabove.

Furthermore successively, there is described a preparation process of a composition(III) comprising compounds having vinyl groups as side chains, which is a third aspect of the present invention.

In the, preparation process, the compound(a) is allowed to react with the compound(d) in the mixing molar ratio of (a)/(d) from 0.1 to 100, preferably from 1 to 5.

Where the mixing ratio of (a)/(d) is less than 0.1, the resulting composition inevitably includes only minor amounts of the compounds having vinyl groups as side chains.

On the other hand, where the mixing ratio of (a)/(d) is more than 100, the resulting composition inevitably includes the compounds having a higher molecular weight.

The preparation process includes an esterification reaction in which the compound(a) is allowed to react with an unsaturated monocarboxylic compound, and an etherification reaction in which the compound(a) is allowed to react with an unsaturated monocarboxylic ester having a hydroxyl group.

In the esterification reaction, there may be preferably used catalysts described below.

Catalysts include tertiary amines such as triethylamine, benzyldimethylamine, quaternary ammonium salts such as tetrabutyl ammonium chloride or tetrabutyl ammonium bromide, and the like; secondary amine salts such as acetic or formic salts of diethylamine; hydroxides of alkali metals or alkali earth metals such as KOH, NaOH, $Ca(OH)_3$ and the like; alkali salts or alkali earth salts such as sodium acetate, calcium acetate; cyclic compounds having nitrogens such as imidazoles or diazabicycloundecene, and the like; phosphorous compounds such as triphenylphosphine or tributylphosphine and the like.

In the etherification reaction, there may be preferably used catalysts described below.

Catalysts include amines such as methylamine, ethylamine, propylamine, piperazine, and the like; organic bases such as pyrizines, imidazoles, and the like; organic acids such as quaternary ammonium salts such as tetrabutyl ammonium bromide, and the like; formic acid, acetic acid, propionic acid and the like; inorganic acids such as sulfuric acid, hydrochloric acid, and the like; alcoholates of alkali metals such as sodium methylate and the like; alkalis such as KOH, NaOH, and the like; Lewis acids such as $BF_3$, $ZnCl_2$, $AlCl_3$, $SnCl_4$, and the like; or complex compounds of the Lewis acids, and organometallic compounds such as triethyl aluminum, diethyl zinc, and the like.

These catalysts are used in a concentration of from 0.01 to 10% by weight, and preferably from 0.1 to 5%, based oil the weight of the starting materials.

The esterification reaction can be carried out at the temperature of from 5° to 150° C., preferably from 80° to 120° C.

The etherification reaction can be carried out at the temperature of from −20° to 150° C., preferably from 0° to 150° C.

The esterification and etherification reactions can be also carried out in the presence of solvent.

A solvent having active hydrogen atoms cannot be used, e.g., ketones such as acetone, methyl ethyl ketone, methyl isobutyl ketone, and the like. On the other hand, aromatic solvents such as benzene, toluene, xylene, and the like and ethers, aliphatic hydrocarbons, and esters can be used.

Furthermore, the esterification or etherification reaction in order to prepare the composition (III) can be also preferably carried out in the presence of a polymerization inhibitor for the purpose of preventing radically thermal polymerization of (meth)acrylic groups.

It is generally known that molecular state oxygen can be used as the radically thermal polymerization inhibitor for (meth)acrylic group.

Furthermore, two groups of specific polymerization inhibitors can be more effectively used together with molecular state oxygen.

The first group of the polymerization inhibitor includes hydroquinone, hydroquinone monomethylether, p-benzoquinone, cresol, t-butyl catechol, 2,4-dimethyl-6-t-butylphenol, 2-tert-butyl-4-methoxy phenol, 3-tert-butyl-4-methoxy phenol, 2,6-di-tert-butyl-p-cresol, 2,5-dihydroxy-p-quinone, piperidine, ethanolamine, alpha-nitroso-beta-Naphtol, diphenylamine, phenothiazine, N-nitrosophenylhydroxyl amine, N,N-diethylhydroxyl amine, etc.

The second group of the polymerization inhibitor includes phosphoric acid, potassium phosphate, sodium phosphate, ammonium hydrogen phosphate, pyrophosphoric acid, potassium pyrophosphate, sodium pyrophosphate, 2ethylhexyl pyrophosphate, potassium 2-ethylhexyl phosphate, sodium 2-ethylhexyl phosphate, tripolyphosphoric acid, potassium tripolyphosphate, and sodium tripolyphosphate.

Although one or more of the first or second polymerization inhibitors can be used, more preferably, both of the first compound and second compound can be, in combination, used together with molecular oxygen, resulting in generating a synergistic effect.

An example of specific molecular state oxygen is air.

Air may be introduced into either liquid phase or gas phase in the reaction vessel. Furthermore nitrogen gas is generally introduced into the reaction vessel in order to prevent forming an explosive gas mixture.

Although higher oxygen/nitrogen volume ratio is more effective for the purpose of preventing radical polymerization of (meth)acrylic group, it is more than 0.01%, preferably from 3 to 5% depending upon the kind of solvent.

Furthermore, although oxygen and nitrogen may be independently introduced, it is important that equipment in the reaction vessel are arranged safely so that an explosive gas mixture is not even partially formed.

The amount used of the first polymerization inhibitors ranges generally from 0.005 to 5%, more preferably from 0.001 to 0.1% by weight based on the unsaturated carboxylic acid or the ester thereof depending upon the kinds of starting materials and various reaction conditions.

The amount used of the second polymerization inhibitors ranges generally from 0.001 to 1%, more preferably from 0.01 to 0.2% by weight.

The polymerization inhibitors may be charged either in the form of powders or a solution with solvents.

It is noted that the polymerization inhibitors can be also preferably used in the epoxidation reaction of the composition (III) described hereinafter.

Furthermore, it is noted that in the case of using 2-hydroxyethylacrylate as an unsaturated carboxylic ester having a hydroxyl group which is an initiator, the composition (III) having vinyl groups as side chains can be represented by the general chemical formula as shown below;

$CH_2=CHCOOCH_2CH_2(Y)_rOH$

<wherein, r is an integer of from 1 to 100 which depends upon the mixing ratio of 2-hydroxyethylacrylate with respect to the compound(a) having at least one vinyl group and one epoxy group in one molecule, Y is a residual group which has at least one vinyl group as a side chain derived from the compound(a)>.

According to a fourth aspect of the present invention, there is provided an epoxy composition (XI) in which there are epoxidized vinyl groups as side chains in the above-mentioned compositions prepared by the reaction of (b) with (a).

According to a fifth aspect of the present invention, there is provided an epoxy composition (XII) in which there are epoxidized vinyl groups as side chains in the above-mentioned compositions prepared by the simultaneous addition reaction of (a), (b) and (c).

According to a sixth aspect of the present invention, there is provided an epoxy composition (XIII) in which there are epoxidized vinyl groups as side chains in the above-mentioned composition prepared by the reaction of (a) with (d).

The three types of epoxy compositions in the fourth, fifth and sixth aspects can be prepared by the epoxidation reactions of the respective compositions(I), (II) and (III) comprising compounds having vinyl groups as side chains in the first, second and third aspects of the invention, with an epoxidation agent.

An epoxidation agent such as a peracid or various hydroperoxides can be used in the epoxidation.

For example, the peracids include performic acid, peracetic acid, perpropionic acid, perbenzoic acid, trifluoroperacetic acid, etc.

Of these, peracetic acid is the preferred epoxidation agent, because it is prepared on an industrial basis at an economical price and has high stability.

The hydroperoxides include hydroperoxide, tertiarylutylhydroperoxide, cumeneperoxide, metachloroperbenzoic acid, etc.

When carrying out the epoxidation reaction, a catalyst can optionally be used. For example, an alkali such as sodium carbonate, or an acid such as sulfuric acid, can be used as a catalyst in the case of using peracetic acid. Furthermore, it is possible to obtain a catalytic effect, for example, using a mixture of tungstic acid and sodium hydroxide together with hydrogen peroxide, or hexacarbonylmolybdenum together with tertiary butyl hydroperoxide in the case of using hydroperoxides.

The epoxidation reaction is carried out in the absence or the presence of a solvent, while adjusting the reaction temperature according to the apparatus and the properties of the raw materials.

The temperature range of the reaction can be selected according to the reactivity of the epoxidation agents to be used.

In the case of peracetic acid which is a preferred epoxidation agent, the preferred temperature range is from 0° to 70° C.

If it is under 0° C., the reaction velocity is slow, and if it is over 70° C., a decomposition of peracetic acid tends to occur.

Furthermore, in the case of tertiarybutylhydroperoxide/ molybdenum dioxide diacetyl acetate which is an example of a hydroperoxide, it is preferably from 20° C. to 150° C., based on the same reason.

The use of solvents is effective for lowering the velocity of reaction of the raw materials and stabilizing the epoxidation agent by dilution.

In the case of peracetic acid, preferred solvents include aromatic compounds, ether compounds and ester compounds.

In particular, ethyl acetate or xylene are the preferred solvents.

For example, in the case of peracetic acid, there can be also used an alkali such as sodium carbonate and an acid such as sulfuric acid as a catalyst.

The molar ratio of the epoxidation agent to be used with respect to the unsaturated bonds is selected according to the proportion of the unsaturated bonds to be desirably retained.

When preparing compositions having many epoxy groups, an equal or higher molar ratio of the epoxidation agents to the unsaturated bonds is preferably used.

However, a molar ratio of more than 10 to the unsaturated bonds is disadvantageous, because of economy and of the side reactions described hereinafter, in the case of peracetic acid, a preferable molar ratio is 1 to 5.

Substituted groups are produced by the side reaction between epoxy groups and acetic acid is by-produced and contained in the desired product, depending upon the epoxidation conditions together with the epoxidation of double bonds.

At least one of additives as described hereinafter can be added in order to prevent such adverse affects: phosphoric acid, potassium phosphate, sodium phosphate, ammonium hydrogenphosphate, pyrophosphoric acid, potassium pyrophosphate, sodium pyrophosphate, potassium 2-ethylhexyl pyrophosphate, sodium 2-ethylhexyl tripolyphosphate, potassium 2-ethylhexyl tripolyphosphate, tripolyphosphoric acid, potassium tripolyphosphate and or sodium tripolyphosphate, sodium 2-ethylhexyl tetrapolyphosphate, potassium 2-ethylhexyl tetrapolyphosphate.

The addition amount is generally from 10 ppm to 10,000 ppm, and preferably from 50 ppm to 1,000 ppm.

It is noted that such additives are described hereinabove as one of polymerization inhibitors for the composition(III) in the third aspect of the present invention.

It generally appears that the addition effect depends upon inactivation of metals derived from the reaction vessel or materials by chelating.

Flushing with water is preferably carried out for the purpose of removing minor amounts of impure components in the reaction.

The amount of water used in flushing is generally from 0.1 to 10 folds amounts, preferably from 1 to 5-folds amounts, based on the reaction crude solution volume.

Furthermore, an aqueous alkali solution can be used in order to remove minor amounts of acids, and further water can be used in order to wash.

An aqueous solution of an alkalis material such as NaOH, KOH, $K_2CO_3$, $Na_2CO_3$, $KHCO_3$, $NaHCO_3$ and $NH_3$ can be used.

Of them, aqueous solutions of NaOH, $Na_2CO_3$, $NaHCO_3$ can be preferably used from the view point of solutions separability and economy.

The concentration used can optionally be selected over a broad range.

The aqueous alkali flushing and water flushing can be carried out in a temperature of generally from 10° to 90° C., and preferably is from 10° to 50° C.

After water flushing and settling, the organic layer in which desired epoxidized products are included is separated from the water layer, followed by removing materials having low boiling points, to obtain the product.

For example, low boiling materials such as solvents are removed by distillation. The distillation condition for removing the low boiling components is from 50° to 200° C., and preferably from 800° to 160° C.

Furthermore, the degree of pressure reduction can be allowed to react by adjusting depending upon the boiling points of the solvents.

The reactions can be carried out by various processes such as a continuous process or a batch process.

In the case of the batch process, the starting materials and additives are preferably charged firstly into a reaction vessel, and then an epoxidizing agent is supplied dropwise.

In the case of the continuous process, the starting materials, an epoxidation agent and additives are supplied continuously into the reaction vessel, and product is continuously taken out of the vessel.

The reaction vessel includes various types such as a completely mixable type or a piston flow type, etc.

The desired epoxidized products can be separated from reaction crude solutions by various engineering procedures.

According to a seventh aspect of the present invention, there is provided a heat-curable resin composition which comprises a composition (I) or (II) as described hereinabove, a compound having polymerizable double bonds and a radical initiator.

Examples of the compound having polymerizable double bonds include compounds having a styrene type double bond such as styrene, vinyl toluene, chlorostyrene and divinylbenzene; (meth)acrylic esters such as methyl methacrylate, ethyl methacrylate, methyl acrylate and ethyl acrylate; allyl esters such as diallylphthalate and a prepolymer thereof; vinyl ethers such as ethylvinylether and butylvinylether; allyl compounds such as diethyleneglycolbisallylcarbonate and a polymer thereof; unsaturated dicarboxylic compound such as maleic acid, maleic anhydride and fumaric acid; maleimides such as N-phenylmaleimide and N,N'-phenylenebismaleimide derived from phthalic anhydride; arid unsaturated polyester resins derived from phthalic anhydride, and the like.

One or more of the above-mentioned compounds can be used.

The mixing ratio of the compound(I) or (II) with respect to the compound having polymerizable double bonds is from 95/5 to 5/95.

Examples of the radical initiator include benzoyl peroxide, t-butylperbenzoate and t-butylcumylperoxide, and the like.

One or more of the above-mentioned compounds can be used.

The radical initiator can be used in the mixing ratio of from generally 0.1 to 5%, preferably from 0.5 to 3% based on the total weight of the compound(I) or (II) and the compound having polymerizable double bonds.

Where it is less than 0.1%, curable velocity is lower.

On the other hand, where it is more than 5%, there is a tendency that a cured article exhibits excessive rigidness or foaming.

Furthermore, an accelerator for curing can be optionally used in the heat-curable resin composition of the present invention.

Examples of the accelerator include cobalt naphtate, cobalt octoenate, manganese naphtate, dimethyl aniline, pyrizine, phenylmorphorine, N,N-dimethylaniline, N,N-dimethylparatoluizine, and the like.

Still further, various additives can be optionally used in the heat-curable resin composition of the present invention.

Examples of the additives include a filler for strengthening such as alumina, titanium, oxide, talc, clay, kaolin, fiber glass, potassium titanate fiber, metallic fiber, ceramic fiber, carbon fiber, calcium carbonate, silica, carbon black, powdered glass; colorants, pigments, mold releasing agents, thermal stabilizers, anti-oxidants, ultraviolet ray absorbents, foaming agents, flame retardant agents, anti-staining agents and coupling agents, and the like.

In addition, the heat-curable resin composition of the present invention can be also used as a coating composition by diluting with solvents.

According to an eighth aspect of the present invention, there is provided an epoxy resin composition which comprise the epoxy composition(XI) or (XII) as described hereinabove, and a curing agent having a functional group being capable of reacting with an epoxy group.

Examples of the curing agent having a functional group being capable of reacting with an epoxy group include a carboxyl-terminated polyester resin having at least two carboxylic groups; phenol type curing agent such as bisphenol A, bisphenol F, novolak type phenol resins and novolak type cresol resins aromatic polyamine type curing agents such as m-phenylene diamine, diaminodiphenyl methane, diaminodiphenyl sulfone and an adduct thereof; polyamide resins; carboxylic anhydrides such as phthalic anhydride, trimellitic anhydride, pyromellitic anhydride, benzophenone tetracarboxylic anhydride, ethyleneglycol bis(anhydrotrimellitate), glyceroltris(anhydrotrimellitate), an alicyclic acid anhydride such as maleic anhydride, succinic anhydride, tetrahydrophthalic anhydride, methyltetrahydrophthalic anhydride, hexahydrophthalic anhydride, methylhexahydrophthalic anhydride, etc., and polyhydric alcohol adducts thereof; polymercaptan resins; dicyandiamide; and complex compounds of boron trifluoride, and the like; amines such as ethylenediamine, diethylenetriamine, triethylenetetramine, isophoronediamine, benzyldimethylamine, xylenediamine, methaphenylenediamine, diaminodimethylsulfone, diaminodiphenyl methane, polymethylenediamine, etc., and or imidazoles such as 2-methylimidazole, 2-ethyl-4-methylimidazole, 2-undecylimidazole, 2-heptadecylimidazole, 2-phenylimidazole, etc.; dicyandiamide and derivatives thereof, polyamide resins which are prepared by a reaction of an aliphatic polyamine with an aliphatic acid such as a saturated aliphatic acid, a dimer acid or a trimer acid, an organic acid hydrazide, melamine and derivatives thereof, a trifluoroboric compound such as a trifluoroborate-amine complex, a compound having silanolic hydroxyl groups, and the like; organic bases such as phosphines, quaternary ammonium salts such as tetrabutyl ammonium bromide, and the like; Lewis acids such as $BF_3$, $ZnCl_2$, $AlCl_4$, $SnCl_4$, and the like; and organo metallic compounds such as triethylaluminum, diethyl zinc, $BF_3$ complexes such as BF3/piperidine complex, and the like.

Furthermore, examples of the curing agent having a functional group being capable of reacting with an epoxy group also include a cationic polymerization initiator of the following formulae such as a diazonium salt such as

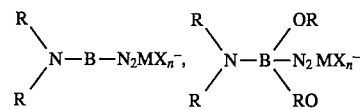

a sulfonium salt such as $R_3\text{-}SMX_R^{31}$,

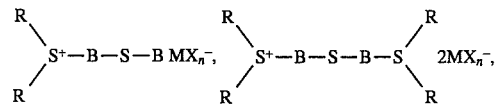

an iodonium salt such as $R\text{-}I^+\text{-}R\ MX_R^-$, a metal complex such as

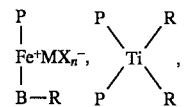

a sulfonium acetone such as

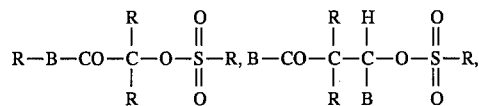

a sulfone compound such as

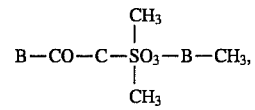

[in the above formulae, B is

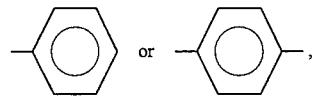

P is

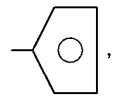

R is selected from hydrogen, an alkyl group, phenyl group, an aryl group and a hydroxyalkyl group, which may be identical or different from each other, $MX_R$, is at least one group selected from the group consisting of $SbF_6$, $AsF_6$, $PF_5$ and $BF_4$], a silicone compound having a property of generating a silanol group, or a complex of an aluminum compound by photo-irradiation.

The specific silicone compound is preferably a silicone compound having one group selected from the group consisting of a peroxysilane group, an o-nitrobenzyloxy group, and an alpha-ketosilyl group.

Specific silicone compounds having a peroxysilane group are represented by the formula $(R^{x1})_R\text{—Si}(O\text{—}O\text{—}R^{x2})_{4-n}$ [in the formula, $R^{x1}$ and $R^{x2}$ hydrogen, a halogen atom, an alkyl group selected from the group consisting of, for example, methyl, ethyl, n-propyl, isopropyl, n-butyl, t-butyl, sec-butyl, n-pentyl, methoxy, ethoxy and chloromethyl or an aryl group selected from the group of, for example, phenyl, naphthyl, anthranyl, benzyl, which may be identical or different from each other, and which can have a substituent selected from the group of a halogen atom, a nitro group, a cyano group, a methoxy group, etc., and n is a natural number of 0 to 3].

Silicone compounds have specific formulae are described hereinafter

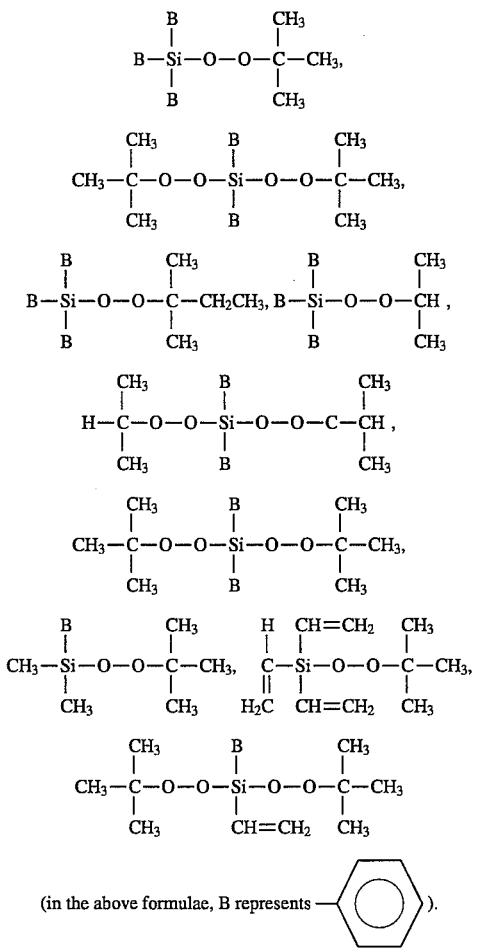

(in the above formulae, B represents —⟨phenyl⟩).

Specific silicone compounds having an o-nitrobenzyloxy group are described hereinafter.

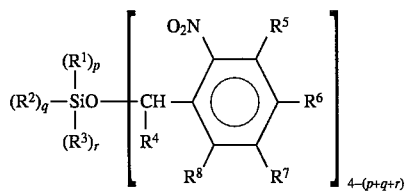

In the above formula, $R^1$, $R^2$ and $R^3$ are hydrogen, a halogen atom, vinyl group, an aryl group, a substituted or an unsubstituted alkyl group having a carbon number of from 1 to 10, an alkoxy group having a carbon number of from 1 to 10, a substituted or an unsubstituted aryl group, a substituted or an unsubstituted aryloxy group and or a siloxy group, respectively, which may be identical or different from, each other; $R^4$ is hydrogen, a substituted or an unsubstituted alkyl group having a carbon number of from 1 to 10, or a substituted or an unsubstituted phenyl group; $R^5$, $R^6$, $R^7$ and $R^8$ are hydrogen, nitro group, cyano group, hydroxy group, mercapto group, a halogen atom, an acetyl group, an aryl group, an alkyl group having a carbon number of from 1 to 5, an alkoxy group having a carbon number of from 1 to 5, a substituted or an unsubstituted aryl group, a substituted or an unsubstituted aryl group and or an aryloxy group, respectively, which may be identical or different from each other; and p, q and r are each a natural number of 0 to 3, respectively, and have a relationship of $1<p+q+r<3$].

Substituted or unsubstituted alkyl groups having a carbon number of from 1 to 10 include methyl, ethyl, propyl, n-butyl, t-butyl, pentyl, chloromethyl, chloroethyl, fluoromethyl and cyanomethyl, etc., and specific alkoxy groups having a carbon number of from 1 to 10 include a methoxy, ethoxy, n-propoxy and or n-butoxy, etc.

Substituted or unsubstituted aryl groups include a phenyl, p-methoxyphenyl, p-chlorophenyl, p-trifluoromethylphenylvinylmethylphenyl(o-nitrobenzyloxy)silane, t-butylmethylphenyl(o-nitrobenzyloxy)silane, triethyl(o-nitrobenzyloxy)silane, tri(2-chloroethyl)-o-nitrobenzyloxysilane, tri(p-trifluoromethylphenyl)-o-nitrobenzyloxysilane, trimethyl[alpha-(o-nitrophenyl)-o-nitrobenzyloxy]silane, dimethylphenyl[alpha-(o-nitrophenyl)-o-nitrobenzyloxy]silane, methylphenyldi[alpha-(o-nitrophenyl)-o-nitrobenzyloxy]silane, triphenyl(alpha-ethyl-o-nitro benzyloxy)silane, trimethyl(3-methyl-2-nitrobenzyloxy)silane, dimethylphenyl(3,4,5-trimethoxy-2-nitrobenzyloxy)silane, triphenyl(4,5,6-trimethoxy-2-nitrobenzyloxy)silane, diphenylmethyl(5-methyl-4-methoxy-2-nitrobenzyloxy)silane, triphenyl(4,5-dimethyl-2-nitrobenzyloxy)silane vinylmethylphenyl(4,5-dichloro-2-nitrobenzyloxy)silane, triphenyl(2,6-dinitrobenzyloxy)silane, diphenylmethyl(2,4-nitrobenzyloxy)silane, triphenyl(3-methoxy-2-nitrobenzyloxy)silane, vinylmethylphenyl(3,4-dimethoxy-2-nitrobenzyloxy)silane, dimethyldi(o-nitrobenzyloxy)silane, methylphenyldi(o-nitrobenzyloxy)silanevinylphenyldi(o-nitrobenzyloxy)silane, t-butylphenyldi(o-nitrobenzyloxy)silane, diethyldi(o-nitrobenzyloxy)silane, 2-chloroethylphenyldi(o-nitrobenzyloxy)silane, diphenyldi(o-nitrobenzyloxy)silane, diphenyldi(3-methoxy-2-nitrobenzyloxy) silane, diphenyldi(3,4-dimethoxy-2-nitrobenzyloxy)silane, diphenyldi(2,6-dinitrobenzyloxy)silane, diphenyldi(2,4-dinitrobenzyloxy)silane, methyltri(o-nitrobenzyloxy)silane, phenyltri(o-nitrobenzyloxy)silane, p-bis(o-nitrobenzyloxydimethylsilyl)benzene, 1,1,3,3-tetraphenyl-1,3-di(o-nitrobenzyloxy)siloxane, and 1,1,3,3,5,5-hexaphenyl-1,5-di(o-nitrobenzyloxy) siloxane.

Furthermore, a silicone compound can be used, such as a silicone compound produced by a reaction between a SiCL-containing silicone resin and o-nitrobenzyl alcohol, a silicone compound having an alpha-ketosilyl group which is represented by the following formula;

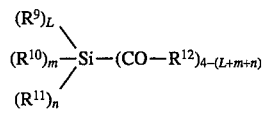

(wherein L, m and n are each a natural number of 0 to 3, respectively; L+m+n is 3 or less than 3; $R^9$, $R^{10}$ and $R^{11}$ represent a hydrocarbon group such as an alkyl group having a carbon number of 1 to 10, an aryl group, an allyl group, vinyl group, an allyloxy group and an alkoxy group having a carbon number of 1 to 10, respectively, which can have a substituent such as a halogen atom, nitro group, cyano group and or methoxy group, which substituents may be identical or different from each other).

Specific compounds having an alpha-ketosilyl group include

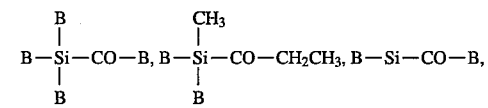

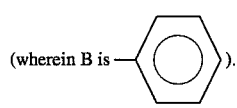

(wherein B is —⟨phenyl⟩).

The mixing amount of the above described silicone compound is generally from 0.2 to 20% by weight, and preferably from 1 to 10% by weight, based on the weight of epoxy resin composition.

Where the amount is smaller than 0.1% by weight, curing of the epoxy resin is not sufficient.

On the, other hand, where the amount is larger than 20% by weight, although available, it is not preferable because of costs and a problem caused by compounds derived from decomposition of the catalyst.

Furthermore, an aluminum compound can also be used as a photocationic polymerization initiator for the present epoxy resin compositions.

Specific aluminum compound includes trismethoxy aluminum, trisethoxy aluminum, trisisopropoxy aluminum, trisphenoxy aluminum, trisparamethylphenoxy aluminum, isopropoxy diethoxyaluminum, trisbutoxy aluminum, trisacetoxy aluminum, trisstearato aluminum, trisbutylate aluminum, trispropionato aluminum, trisisopropionato aluminum, trisacetylacetonato aluminum, tristrifluoroacetylacetonatoaluminum, trishexafluoroacetylacetonato aluminum, trisethylacetonato aluminum, trissalicylaldehydato aluminum, trisdiethylmalolato aluminum, trispropylacetoacetato aluminum, butylacetoacetato aluminum, trisdipivaloylmethanato aluminum, diacetylacetonatodipivaloylmethanato aluminum.

The above-mentioned compounds are represented by formulae

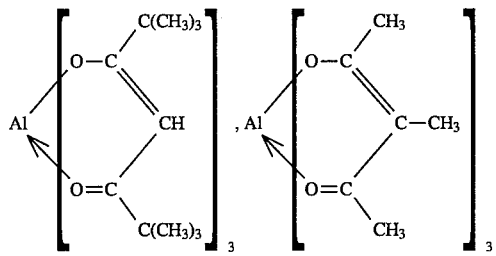

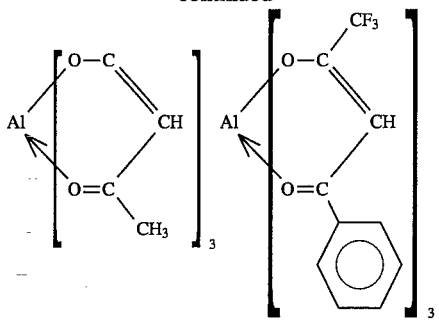

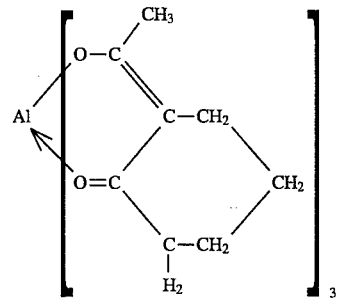

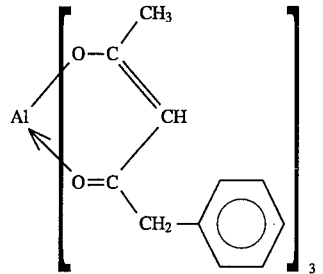

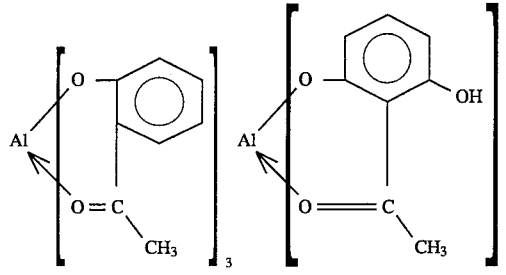

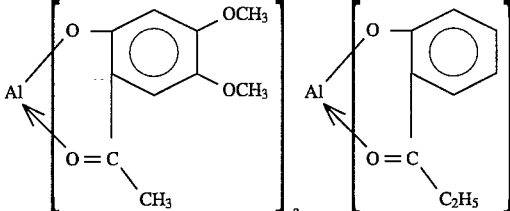

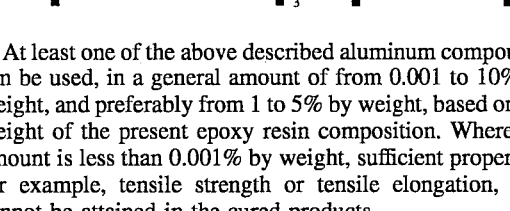

At least one of the above described aluminum compounds can be used, in a general amount of from 0.001 to 10% by weight, and preferably from 1 to 5% by weight, based on the weight of the present epoxy resin composition. Where the amount is less than 0.001% by weight, sufficient properties, for example, tensile strength or tensile elongation, etc., cannot be attained in the cured products.

On the other hand, where the amount is larger than 10% by weight, it is not preferable because of costs and a problem of a tendency of lowering in the resistance to moisture.

One or more curing agents can be used.

The epoxy resin compositions of the present invention which comprises the epoxy composition(XI) or (XII) and a curing agent can provide encapsulating resin compositions, for example, for a light emitting or receiving device, a resin composition for solder resist inks and coating compositions, for example, such as a powder coating composition and photocurable compositions.

Preferred curing agents should be selected according to the various uses from the above-mentioned curing agents.

Furthermore, an accelerator for curing can be optionally used together with the curing agent according to uses.

Examples of the accelerator include water, alcohols such as ethanol, propanol, isopropanol, cyclohexanol, ethyleneglycol, carboxylic acids such as acetic acid, propionic acid, succinic acid or hexahydrophthalic acid, amines such as ethylenediamine, diethylenetriamine, and the like, depending upon the kind of the curing agents to be used.

For example, in the case that the epoxy resin compositions are used for an encapsulating resin composition, an acid anhydride which is a curing agent and an amine which is an accelerator for curing are used, in combination and a novolak type phenol resin which is a curing agent is preferably used together with imidazoles which are an accelerator for curing.

Furthermore, in the case that the epoxy resin compositions are used for a photo-curable composition, the above-mentioned organic aluminum compounds and silicone compounds should be used in combination.

And, in the case of using for a photo-curable composition, curing is carried out by photo-irradiation.

For example, there can be used an ultraviolet ray having a wavelength range of from 180 to 700 nm.

The irradiation period of time also depends upon the kind of the epoxy resin compositions, the kind of the above-mentioned curing agents, and the kind of the irradiation source.

Generally, it is from 10 seconds to 30 minutes, and preferably, it is from 20 to 60 seconds.

Furthermore, the temperature for photo-curing during heating also depends upon the kind of the above-mentioned curing agents it is usually from 20° to 200° C., and preferably, is from 60° to 100° C.

Still further, the temperature for postcuring after the photo-curing also depends upon the kind of the above-mentioned curing agents; it is usually from 50° to 200° C., and preferably, is from 100° to 1800° C.

There can be used a low-pressure mercury lamp, a high-pressure mercury lamp, a carbon arc lamp, a xenon lamp, an argon glow discharge lamp, a metal halide lamp, etc., as a discharging source of irradiation rays.

On the other hand, for example, in the case that the epoxy resin compositions are used for a powder coating composition, a carboxyl-terminated polyester resin having at least two carboxylic groups, novolak type phenol resins and acid anhydrides, etc., are more preferably selected from the above-mentioned curing agents.

A process for preparing a powder coating composition and a process for producing the carboxyl-terminated polyester resin having at least two carboxylic groups are representatively described in detail hereinafter.

A polyhydric alcohol and a polycarboxylic acid or an anhydride thereof are charged into a reactor.

When the mole number of the polyhydric alcohol is n, the polycarboxylic acid or hydride thereof is added in an amount of (n+1) mole number to obtain a carboxyl-terminated polyester resin.

The polyester resin can be synthesized according to the following reaction scheme.

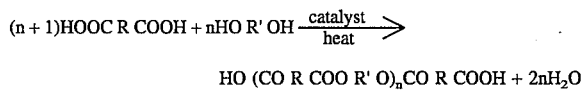

$$HO\,(CO\,R\,COO\,R'\,O)_n CO\,R\,COOH + 2nH_2O$$

An appropriate reaction temperature is from 100 to 230 C.

Removal of water allows the reaction to proceed so that the yield of ester increases.

This reaction may proceed in the absence of any catalyst, but a catalyst conventionally used for esterification reaction may also be used.

The examples of a catalyst include sulfuric acid, p-toluene sulfonic acid, titanium compounds such as tetrabutyl titanate, and the like.

The examples of a polycarboxylic acid or an anhydride thereof include isophthalic acid, terephthalic acid, cyclohexane dicarboxylic acid, succinic acid, glutaric acid, adipic acid, pimelic acid, suberic acid, azelaic acid, maleic acid, sebacic acid, fumaric acid, dodecanoic acid, hexahydrophthalic acid, methylhydrophthalic acid, tetrahydrophthalic acid, methyltetrahydrophthalic acid, an anhydride of an aliphatic tricarboxylic acid such as 1,2,3-propane tricarboxylic acid, an anhydride of an aromatic tricarboxylic acid such as trimellitic acid or hemimellitic acid, and/or an anhydride of alicyclic tricarboxylic acid such as 6-methyl-cyclohexe-4-en-1,2,3-tricarboxylic acid, pyromellitic di-anhydride or benzophenon-3,3', 4,4'-tetracarboxylic di-anhydride.

It is possible to use either one kind of a polycarboxylic acid or anhydride thereof or a mixture composed of two or more kinds thereof.

The examples of a polyhydric alcohol include ethylene glycol, propylene glycol, 1,4-butanediol, 1,3-butylene glycol, 1,4-butylene glycol, 2-methylpropanediol, 1,6-hexanediol, 1,2-dodecane diol, neopentyl glycol, cyclohexanediol, glycerine, trimethylolpropane, pentaerythritol, and/or dipentaerythritol, neopentyl glycol hydroxy pivalate, 1,4-cyclohexanedimethanol, an ethylene oxide adduct of bisphenol A, 1,4-hydroxyquinone and the like.

It is possible to use either one kind of a polyhydric alcohol, or a mixture composed of two or more kinds thereof.

A polyester resin to be used in the present invention should include at least two carboxylic groups per molecule; in the case of less than two, crosslinked structures cannot be formed in a coating layer.

The acid value of the carboxyl-terminated polyester resin having at least two carboxylic groups in the molecule is preferably in the range of from 15 to 100.

When the acid value is less than 15, reactivity of the polyester resin is low, and amount of crosslinked structures does not increase.

On the other hand, if the acid value is larger than 100, the molecular weight of the polyester resin is lower, and a solid polyester cannot be obtained. Also, in the case that the equivalent of epoxy resin is mixed with the polyester resin, the content of the polyester resin is meaninglessly lower.

It is also noted that a larger acid value corresponds to lower molecular weight, whereas a smaller acid value corresponds to higher molecular weight.

Preferable polyester resin to be used is solid at room temperatures, with a glass transition temperature in the range of from 40° to 80° C.

The mixing ratio of epoxy groups to carboxyl groups is preferably in the range of from 0.5/1 to 1.5/1 based on a chemical equivalent basis.

If it is more than 1.5/1, the residual epoxy groups after curing are relatively rich.

On the other hand, if the mixing ratio is less than 0.5/1, and then the residual carboxylic groups after curing are relatively rich.

Neither of these cases are preferable, because of formation of thermally and optically unstable coating layers.

Furthermore, the powder coating compositions of the present invention can optionally include an accelerator for curing epoxy resins.

These accelerators are preferably used in a range of not more than 10 parts by weight, and more preferably of not more than 5 parts by weight, based on 100 parts by weight of the powder coating composition.

If the composition contains not less than 10 parts by weight of the curing accelerator, it is not preferable because of adverse effects on the properties of the resulting coated layer.

The accelerator for curing epoxy resins can be mixed either at the same time of mixing of the resins or immediately before use.

Examples of the adding auxiliary substances include pigments, flow control agents, an agent for preventing blocking, ultraviolet ray absorber, antioxidant agent, and/or antistatic agent and levelling agents, deaerating agents such as benzoin, a flame-proofing agent and the like, which can be optionally mixed into the powder coating compositions of the present invention.

Furthermore, other epoxy resins such as a bisphenol A type epoxy resin, a bisphenol F type epoxy resin, a novolak type epoxy resin, an alicyclic epoxy resin, or an epoxy diluent such as styrene oxide and butyl glycidylether can be optionally mixed into the powder coating compositions.

The above-mentioned components in the present invention and optional adding auxiliary substances conventionally used in the manufacture of powder paints or varnishes are mixed, followed by kneading, at a temperature of from 80 C. to 120 C. with a melting kneader such as a heated mixing roll or an extruder, followed by cooling after kneading sufficiently, and then crushing with a crusher to obtain a powder composition having a particle size which is between 0.1 and 250 microns, and preferably from 10 to 75 microns.

The above-mentioned process is one of melting-blend processes.

Also, drying-blend processes in which the essential components are mixed in the form of powders and spraying-dry processes in which the essential components are dissolved into a non-flammable solvent and sprayed into high temperature gas atmosphere while evaporating the solvents to obtain the powder coating compositions, can be used when preparing the powder coating compositions.

The powder coating compositions can be coated onto substrates, and particularly desirably onto metal articles charged with electrostatic electricity, by use of a fluidized bed coating technique or by use of an electrostatic spray gun and the like.

It is noted that other conventional epoxy resins and various additives can be optionally mixed depending upon the uses of the present epoxy resin compositions.

Examples of the other conventional epoxy resins include an epi-bis type epoxy resin, a novolak type epoxy resin, a glycidyl ether type epoxy resin and an alicyclic epoxy resin, and the like.

Examples of the additives include a filler such as alumina, titanium oxide, talc, clay, kaolin, fiber glass, potassium titanate fiber, metallic fiber, ceramic fiber, carbon fiber, calcium carbonate, silica, carbon black, powdered glass; dyes, pigments, releasing agents, thermal stabilizers, antioxidants, ultraviolet ray absorbents, foaming agents, flame-proofing agents, coupling agents and anti-staining agents, and the like.

According to a ninth aspect of the present invention, there is provided a radically (co)polymerized composition which comprises in which the compositions(III) as described hereinabove is radically (co)polymerized in the presence of a polymerization initiator, and optionally at least one vinyl monomer.

According to a tenth aspect of the present invention, there is provided a radically (co)polymerized composition which comprises in which the compositions(XIII) as described hereinabove are radically (co)polymerized in the presence of a polymerization initiator, and optionally at least one vinyl monomer.

The radical (co)polymerizations can be carried out, for example, by a solution (co)polymerization in the presence of solvents or a suspension (co)polymerization in the presence of dispersion media while stirring, at a temperatures range of from 60° to 180° C., a polymerization period of from 1 to 40 hours and under the presence of a radical (co)polymerization initiator, which are conventionally known radical (co)polymerization processes.

For example, examples of the solvents include hydrocarbons such as heptane, toluene, xylene, octane; esters such as ethyl acetate, n-butyl acetate, isopropyl acetate, methylcellosolve acetate, butylcarbitol acetate; ketones such as methyl ethyl ketone, methyl isobutyl ketone and diisobutylketone, and the like; alcohols such as ethanol, n-butanol, sec-butanol, isobutanol, and the like; ethers such as n-butylether, dioxane, ethyleneglycol monomethylether, ethyleneglycol monoethylether, and the like. One or more solvents can be used.

Examples of the radical polymerization initiators include peroxides such as benzoyl peroxide, t-butylperoxy-2-ethyl-hexanoate, and the like; azo compounds such as azobis-isobutyro nitrile, azobis-dimethyl varelonitrile, and the like, which are conventionally known radical polymerization initiators.

According to an eleventh aspect of the present invention, there is provided an epoxidized polymer composition obtained by epoxidizing a radically (co)polymerized composition of the ninth aspect as described above, with an epoxidation agent.

The examples of the epoxidation agents include the epoxidation agents such as the various peracids as previously-mentioned(in the fourth, fifth and sixth aspects). And, the epoxidation reaction conditions can be also carried out as previously-mentioned.

According to an twelfth aspect of the present invention, there is provided a curable resin composition which comprises a (co)polymer obtained by (co)polymerizing an epoxy composition(XIII) as described hereinabove, a cationic polymerizing initiator and optionally other epoxy resin having at least one epoxy group.

Examples of the cationic polymerizing initiator include cation-generating substances selected from the previously-mentioned(in the eighth aspect) various curing agents other than carboxyl terminated polyester resins and organic acid anhydrides.

Specifically, there are included organic bases, organic acids inorganic acids, alkalis, alkolates, organic metals, Lewis acids, complexes thereof, diazonium salts, sulfonium salts, iodonium salts, sulfonium acetone compounds, silanol group-generating silicone compounds, aluminum compounds, etc.

Examples of other epoxy resin having at least one epoxy group which is an optional component, include various epoxy resins such as the abovementioned epoxy compositions(XI) add (XII), epi-bis type epoxy resins, novolak type epoxy resins, imide type epoxy resins, urethane type epoxy resins, epoxidized polybutadienes, various alicyclic epoxy compounds such as 3,4-epoxycyclohexylmethyl-3,4-epoxy-cyclohexanecarboxylate, a lactone-adduct thereof, 3,4-epoxy-6-methylcyclohexylmethyl-3,4-epoxy-6-cyclohexanecarboxylate, a lactone-adduct thereof, 4-vinylcyclohexene-1-oxide, 5-vinylbicyclo[2.2.1]hepto-2-ene-2-oxide, limonene oxide, trivinylcyclohexanemonoxide, divinylbenzenemonoxide, butadiene monoxide, 2-epoxy-9-decene, allylglycidyl ether, glycidylstyrylether,

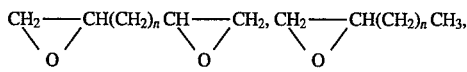

styrene oxide, etc.

The use amount of the cationic polymerizing initiator is generally from 0.001 to 20 parts by weight, preferably from 0.1 to 5% by weight based on the total amount of the compositions.

Furthermore, the use amount of the other epoxy resin which is an optional component is generally from 0 to 95% by weight, preferably from 10 to 80% by weight based on the total amount of the compositions.

The present invention is specifically illustrated by the following Examples, but the scope of the invention is not quite limited by the Examples.

EXAMPLE 1

[Preparation of a composition(II) comprising compounds having vinyl groups as side chains]

74.1% (1.0 mol) of butanol as a compound(c), 925.2 g (6.0 moles) of hexahydrophthalic anhydride as a compound(b) and 3.72 g of tetramethyl ammonium chloride were charged into a reaction vessel having a capacity of 3 L equipped with a reflux condenser, a dropwise funnel, a stirrer and a tube for supplying nitrogen gas, followed by being sufficiently mixed.

Successively, the reaction vessel was heated while introducing nitrogen gas and allowed to continuously react while stirring.

Heating was stopped when the temperature reached 85° C.

The temperature of the reaction vessel was raised to 140° C. according to the progress of the reaction of butanol with hexahydrophthalic anhydride.

It was confirmed by a gas-chromatography analysis that residual butanol was in trace.

In succession, 744.0 g(6.0 moles) of 4-vinylcyclohexene-1-oxide as a compound(a) was added dropwise over 1 hour while maintaining at the temperature of 100° C. and allowed to react.

After completion of the dropwise addition, aging was further continued for 2 hours at 150° C.

It was confirmed by a gas-chromatography analysis that residual 4-vinylcyclohexene-1-oxide was in trace and the conversion of 4-vinyl-cyclohexene-1-oxide was 99.6%.

The crude reaction solution was removed from the reaction vessel and cooled to room temperatures on a releasing paper to obtain a polymer having vinyl groups which has an iodine value of 86.9 (g/100 g).

The polymer was designated as [A-1]

The polymer[A-1] obtained was analyzed by $^1$H-NMR, $^{13}$C-NMR and FT-IR.

The NMR analysis was carried out in $CDCl_3$ and at 35 plus/minus 0.1° C., with JNM-EX270 analyzer manufactured by Nihon Denshi, Ltd.

The FT-IR analysis was carried out by a KBr method, with FT-IR-5300 analyzer manufactured by Nihon Bunko Industries, Ltd.

The spectra are assigned as described below.

< $^1$H-NMR spectra >

| | |
|---|---|
| delta 0.9 ppm | due to proton of $CH_3$ in butanol |
| delta 1.4–2.0 ppm | due to proton of $CH_2$ in cyclohexane ring |
| | due to proton of $—CH_2—CH_2$ in butanol |
| delta 2.1–2.4 ppm | due to proton of $CH_2$ having a vinyl group in cyclohexane ring |
| delta 2.8 ppm | due to proton of methine in hexahydrophthalic anhydride |
| delta 3.6–3.9 ppm | due to proton of methine to which oxygen bonds, in cyclohexane ring |
| delta 4.0–4.1 ppm | due to proton of ester bond $—CH_2—O—CO—$ |
| delta 4.8 ppm | due to proton of OH |
| delta 4.9–5.0 ppm | due to proton of $CH_2$ in vinyl group |
| delta 5.8–5.9 ppm | due to proton of CH in vinyl group |

< $^{13}$C-NMR spectra >

| | |
|---|---|
| delta 13.4 ppm | due to carbon of $CH_3$ in butanol |
| delta 18.9–19.8 ppm | due to carbon of $—CH_2—CH_2—$ in butanol |
| delta 23.5–35.6 ppm | due to carbon of $CH_2$ in cyclohexane ring |
| | due to carbon of $CH_2$ having a vinyl group in cyclohexane ring |
| delta 42.3–42.8 ppm | due to carbon of methine in hexahydrophthalic anhydride |
| delta 64.0 ppm | due to carbon of ester bond $—CH_2—O—CO—$ |
| delta 67.4 ppm | due to carbon of methine to which OH group bonds, in cyclohexane ring |
| delta 69.3 ppm | due to carbon of methine to which oxygen atom bonds, in cyclohexane ring |
| delta 113.3 ppm | due to carbon of $CH_2$ in vinyl group |
| delta 141.2 ppm | due to carbon of CH in vinyl group |
| delta 172–173 ppm | due to carbon of ester bond |

< IR spectra >

| | |
|---|---|
| 3520 $cm^{-1}$ | absorption due to OH group |
| 2800–2900 $cm^{-1}$, 1450 $cm^{-1}$ | absorption due to cyclohexane ring |
| 1732 $cm^{-1}$ | absorption due to ester group |
| 1641 $cm^{-1}$, 912 $cm^{-1}$ | absorption due to vinyl group |

By the above assignments, it was confirmed that the polymer [A-1] has the following chemical structure.

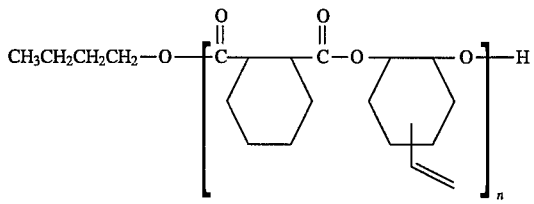

Furthermore, n=5.4 (average) was confirmed in the chemical structure by the $^1$H-NMR spectra assignments.

EXAMPLE 2

[Preparation of a composition (II) comprising compounds having vinyl groups as side chains]

Same procedures were repeated as described in Example 1, except that 62.1 g (1.0 mol) of ethyleneglycol as a compound(c), 925.2 g (6.0 moles) of hexahydrophthalic anhydride as a compound(b) and 3.50 g of triethyl amine were used, and 744.0 g(6.0 moles) of 4-vinylcyclohexene-1-oxide as a compound(a) was added dropwise while maintaining at the temperature of 140° C. to obtain a polymer having vinyl groups which has an iodine value of 87.0 (g/100 g).

The polymer was designated as [A-2]

The polymer[A-2] obtained was analyzed by $^1$H-NMR, $^{13}$C-NMR and FT-IR.

The spectra are assigned as described below.

| < $^1$H-NMR spectra > | |
| --- | --- |
| delta 1.4–2.0 ppm | due to proton of $CH_2$ in cyclohexane ring |
| delta 2.1–2.3 ppm | due to proton of $CH_2$ having a vinyl group in cyclohexane ring |
| delta 2.8 ppm | due to proton of methine in hexahydrophthalic anhydride |
| delta 3.6–3.8 ppm | due to proton of methine to which oxygen bonds, in cyclohexane ring |
| delta 4.2–4.3 ppm | due to proton of ester bond —CO—O—$CH_2$—O—$CH_2$—O—CO— |
| delta 4.8–4.9 ppm | due to proton of OH |
| delta 4.9–5.0 ppm | due to proton of $CH_2$ in vinyl group |
| delta 5.8–5.9 ppm | due to proton of CH in vinyl group |
| < $^{13}$C-NMR spectra > | |
| delta 23.5–35.6 ppm | due to carbon of $CH_2$ in cyclohexane ring and carbon of $CH_2$ having a vinyl group in cyclohexane ring |
| delta 42.2–42.5 ppm | due to carbon of methine in hexahydrophthalic anhydride |
| delta 61.9 ppm | due to carbon of ester bond in —CO—O—$CH_2$—O—$CH_2$—O—CO— |
| delta 67.4 ppm | due to carbon of methine to which OH group bonds, in cyclohexane ring |
| delta 69.3 ppm | due to carbon of methine to which oxygen atom bonds, in cyclohexane ring |
| delta 113.3 ppm | due to carbon of $CH_2$ in vinyl group |
| delta 141.9 ppm | due to carbon of CH in vinyl group |
| delta 172–172.9 ppm | due to carbon of ester bond |
| < IR spectra > | |
| 3520 cm$^{-1}$ | absorption due to OH group |
| 2800–2900 cm$^{-1}$, 1450 cm$^{-1}$ | absorption due to cyclohexane ring |
| 1732 cm$^{-1}$ | absorption due to ester group |
| 1641 cm$^{-1}$, 912 cm$^{-1}$ | absorption due to vinyl group |

By the above assignments, it was confirmed that the polymer[A-2] has the following chemical structure.

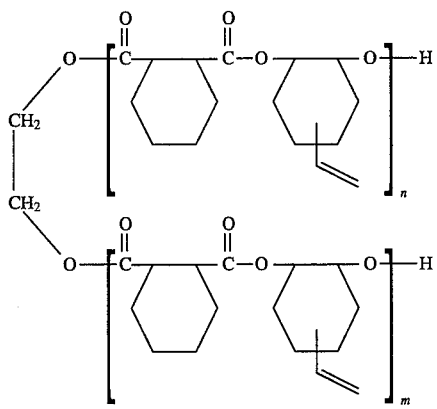

Furthermore, n+m=5.6 (average) was confirmed in the chemical structure by the $^1$H-NMR spectra assignments.

EXAMPLE 3

[Preparation of a composition (II) comprising compounds having vinyl groups as side chains]

Same procedures were repeated as described in Example 1, except that 134.2 g (1.0 mol) of trimethylol propane as a compound(c), 925.2 g (6.0 moles) of hexahydrophthalic anhydride as a compound(b) and 3.50 g of tetramethyl guanidine were used, and 744.0 g (6.0 moles) of 4-vinylcyclohexene-1-oxide as a compound(a) was added dropwise while maintaining at the temperature of 180° C. to obtain a polymer having vinyl groups which has an iodine value of 84.2 (g/100 g).

The polymer was designated as [A-3].

The polymer [A-3] obtained was analyzed by $^1$H-NMR, $^{13}$C-NMR and FT-IR.

The spectra are assigned as described below.

| < $^1$H-NMR spectra > | |
| --- | --- |
| delta 0.9 ppm | due to proton of $CH_3$ in trimethylolpropane |
| delta 1.4–2.0 ppm | due to proton of $CH_2$ in cyclohexane ring |
| delta 2.1–2.3 ppm | due to proton of $CH_2$ having a vinyl group in cyclohexane ring |
| delta 2.7 ppm | due to proton of methine in hexahydrophthalic anhydride |
| delta 3.6–3.9 ppm | due to proton of methine to which oxygen bonds in cyclohexane ring |
| delta 4.0–4.1 ppm | due to proton of ester bond —C—($CH_2$—O—CO—)$_3$ |
| delta 4.8–4.9 ppm | due to proton of OH |
| delta 4.9–5.0 ppm | due to proton of $CH_2$ in vinyl group |
| delta 5.8–5.9 ppm | due to proton of CH in vinyl group |
| < $^{13}$C-NMR spectra > | |
| delta 7.5 ppm | due to carbon of $CH_3$ in hexahydrophthalic anhydride |
| delta 19.8 ppm | due to proton of methylene of $CH_3CH_2C$ in trimethylol propane |
| delta 23.5–35.6 ppm | due to carbon of $CH_2$ in cyclohexane ring and carbon in $CH_2$ having a vinyl group in cyclohexane ring |
| delta 41.2–43.1 ppm | due to carbon of methine in hexahydrophthalic anhydride |
| delta 63.7 ppm | due to carbon of ester bond —C—($CH_2$—O—CO—)$_3$ |
| delta 67.5 ppm | due to carbon of methine to which OH group bonds, in cyclohexane ring |
| delta 68.1–70.0 ppm | due to carbon of methine to which oxygen atom bonds, in cyclohexane ring |
| delta 113.3 ppm | due to carbon of $CH_2$ in vinyl group |
| delta 141.9 ppm | due to carbon of CH in vinyl group |
| delta 171.8–174.0 ppm | due to carbon of ester bond |
| < IR spectra > | |
| 3520 cm$^{-1}$ | absorption due to OH group |
| 2850–2950 cm$^{-1}$, 1440 cm$^{-1}$ | absorption due to cyclohexane ring |
| 1732 cm$^{-1}$ | absorption due to ester group |
| 1641 cm$^{-1}$, 912 cm$^{-1}$ | absorption due to vinyl group |

By the above assignments, it was confirmed that the polymer [A-3] has the following chemical structure:

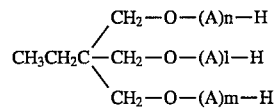

[wherein A is 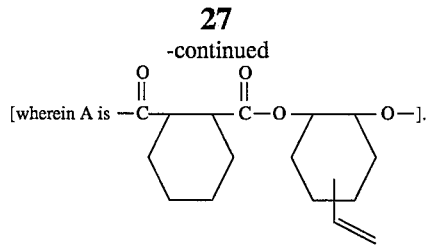].

Furthermore, n+m+1=5.5 (average) was confirmed in the chemical structure by the $^1$H-NMR spectra assignments.

EXAMPLE 4

[Preparation of a composition(II) comprising compounds having vinyl groups as side chains]

Same procedures were repeated as described in Example 1, except that 261.2 g (1.0 mol) of tris-2-hydroxyethylisocyanurate as a compound(c), 1008 g (6.0 moles) of methylhexahydrophthalic anhydride as a compound(b) and 3.72 g of tetraethylene diamine were used, and 744.0 g(6.0 moles) of 4-vinylcyclohexene-1-oxide as a compound(a) was added dropwise while maintaining at the temperature of 120° C. to obtain a polymer having vinyl groups which has an iodine value of 75.0 (g/100g).

The polymer was designated as [A-4].

The polymer [A-4] obtained was analyzed by $^1$H-NMR, $^{13}$C-NMR and FT-IR.

The spectra are assigned as described below.

| < $^1$H-NMR spectra > | |
|---|---|
| delta 0.93 ppm | due to proton of —CH$_3$ in methyl hexahydrophthalic anhydride |
| delta 1.4–2.0 ppm | due to proton of CH$_2$ in cyclohexane ring |
| delta 2.1–2.2 ppm | due to proton of CH$_2$ having a vinyl group in cyclohexane ring |
| delta 2.8 ppm | due to proton of methine in methyl hexahydrophthalic anhydride |
| delta 3.6–3.7 ppm | due to proton of methine to which oxygen bonds, in cyclohexane ring |
| delta 4.1–4.2 ppm | due to proton of ester bond —CH$_2$—O—CO— |
| delta 4.8 ppm | due to proton of OH |
| delta 4.9–5.0 ppm | due to proton of CH$_2$ in vinyl group |
| delta 5.8–5.9 ppm | due to proton of CH in vinyl group |
| < $^{13}$C-NMR spectra > | |
| delta 21.7–22.1 ppm | due to carbon of CH$_2$ bonded to nitrogen atom |
| delta 23.6–35.6 ppm | due to carbon of CH$_2$ in cyclohexane ring and carbon of CH$_2$ having a vinyl group in cyclohexane ring |
| delta 41.2–43.1 ppm | due to carbon of methine in methyl hexahydrophthalic anhydride |
| delta 60.6 ppm | due to carbon of ester bond —CH$_2$—O—CO— |
| delta 67.2 ppm | due to carbon of methine to which OH group bonds, in cyclohexane ring |
| delta 69.2 ppm | due to carbon of methine to which oxygen atom bonds, in cyclohexane ring |
| delta 113.2 ppm | due to carbon of CH$_2$ in vinyl group |
| delta 141.7 ppm | due to carbon of CH in vinyl group |
| delta 148.7 ppm | due to carbon of —N—CO—N— in isocyanurate ring |
| delta 172.0 ppm | due to carbon of ester group |
| < IR spectra > | |
| 3524 cm$^{-1}$ | absorption due to OH group |
| 2850–2950 cm$^{-1}$, 1458 cm$^{-1}$ | absorption due to cyclohexane ring |
| 1732 cm$^{-1}$ | absorption due to ester group |
| 1687 cm$^{-1}$ | absorption due to —CO— of —N—CO—N— in isocyanurate ring |
| 1641, 912 cm$^{-1}$ | absorption due to vinyl group |

By the above assignments, it was confirmed that the polymer [A-4] has the following chemical structure.

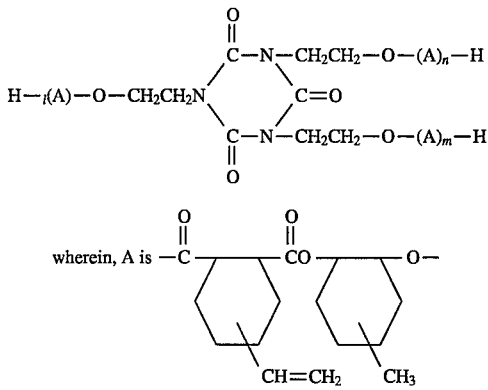

Furthermore, n+m+1=5.5 (average) was confirmed in the chemical structure by the $^1$H-NMR spectra assignments.

EXAMPLE 5

[Preparation of a composition(II) comprising compounds having vinyl groups as side chains]

Same procedures were repeated as described in Example 1, except that 60.1 g (1.0 mol) of acetic acid as a compound(c), 1008 g (6.0 moles) of methylhexahydrophthalic anhydride as a compound(b) and 4.50 g of tetramethyl ammonium chloride were used, and 913.2 g(6.0 moles) of limonene oxide as a compound(a) was added dropwise over 1.5 hour while maintaining at the temperature of 80° C.

After completion of the dropwise addition, the reaction temperature was raised 150° C., and aging was continued for 2 hours to confirm the conversion of limonene oxide of 99.7% and to obtain a polymer having vinyl groups which has an iodine value of 76.0 (g/100 g).

The polymer was designated as [A-5].

The polymer [A-5] obtained was analyzed by $^1$H-NMR, $^{13}$C-NMR and FT-IR.

The spectra are assigned as described below.

| < $^1$H-NMR spectra > | |
|---|---|
| delta 0.93 ppm | due to proton of —CH$_3$ in methyl hexahydrophthalic anhydride |
| delta 1.8 ppm | due to proton of —CH$_3$ in acetic acid |
| delta 1.7–2.0 ppm | due to proton of CH$_2$ in cyclohexane ring |
| delta 2.1–2.2 ppm | due to proton of CH$_2$ having a vinyl group in cyclohexane ring |
| delta 2.8 ppm | due to proton of methine in methyl hexahydrophthalic anhydride |
| delta 4.6–4.7 ppm | due to proton of CH$_2$ in vinyl group |
| delta 10.8 ppm | due to proton of COOH at terminal position |
| < $^{13}$C-NMR spectra > | |
| delta 19.2 ppm | due to carbon of CH$_3$ bonded to carbon atom which bonds to oxygen atom in ester group |
| delta 20.6 ppm | due to carbon of CH$_3$ in acetic acid |
| delta 21.2 ppm | due to carbon of CH$_3$ which bonds to vinyl group |

| | |
|---|---|
| delta 23.6–35.6 ppm | due to carbon of $CH_2$ in cyclohexane ring and carbon of $CH_2$ having a vinyl group in cyclohexane ring |
| delta 41.5–42.7 ppm | due to carbon of methine in methyl hexahydrophthalic anhydride |
| delta 108.2 ppm | due to carbon of $CH_2$ in vinyl group |
| delta 141.7 ppm | due to carbon of CH in vinyl group |
| delta 148.3 ppm | due to carbon of vinyl group to which methyl group bonds |
| delta 176.0 ppm | due to carbon of ester group |
| < IR spectra > | |
| 3500–3600 $cm^{-1}$ | absorption due to OH group |
| 2850–2950 $cm^{-1}$ | absorption due to cyclohexane ring |
| 1720 $cm^{-1}$ | absorption due to ester group |
| 1650–890 $cm^{-1}$ | absorption due to vinyl group |

By the above assignments, it was confirmed that the polymer[A-5] has the following chemical structure.

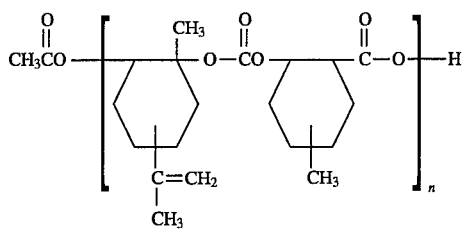

Furthermore, n=5.5 (average) was confirmed in the chemical structure by the $^1$H-NMR spectra assignments.

EXAMPLE 6

[Preparation of a composition(I) comprising compounds having vinyl groups as side chains]

1328.9 g (8.0 moles) of phthalic acid as a compound(b), 500 g (5.0 moles) of allylglycidylether and 154 g (2.0 moles) of 1,2-epoxy-9-decene as a compound(a) and 2.1 g of tetramethyl ammonium chloride and 50 ppm of stannous octylate were charged into a reaction vessel having a capacity of 3 L equipped with a reflux condenser, a stirrer, dropwise funnel, a tube for supplying nitrogen gas and further a tube for removing water.

Temperature in the reaction vessel was raised while introducing nitrogen gas, followed by continuously stirring after solid starting materials began to melt and change to slurry state.

Temperature was further raised to 130° C. and heating was stopped.

Aging in the reaction vessel was continued for 1 hour while maintaining at 150° C. to obtain an epoxy group conversion of 99.9%.

Furthermore, the temperature was raised to 180° C., and then the esterification under dehydrating was carried out while raising from 180° C. to 200° C. over 2 hours.

Total dehydrated water was 127.3 g (theoretical amount: 126 g).

A polymer having vinyl groups which has an iodine value of 74.0 (g/100 g) was obtained. The polymer was designated as [A-6].

The polymer [A-6] obtained was analyzed by $^1$H-NMR, $^{13}$C-NMR and FT-IR.

The spectra are assigned as described below.

| | |
|---|---|
| < $^1$H-NMR spectra > | |
| delta 4.9–5.0 ppm | due to proton of $CH_2$ in vinyl group |
| delta 5.8–5.9 ppm | due to proton of CH in vinyl group |
| < $^{13}$C-NMR spectra > | |
| delta 108.2 ppm | due to carbon of $CH_2$ in vinyl group |
| delta 148.3 ppm | due to carbon of in vinyl group to which methyl group bonds |
| delta 176.0 ppm | due to carbon of ester group |
| < IR spectra > | |
| 3524 $cm^{-1}$ | absorption due to OH group |
| 1732 $cm^{-1}$ | absorption due to ester group |
| 1641–912 $cm^{-1}$ | absorption due to vinyl group |

EXAMPLE 7

[Preparation of a composition (I) comprising compounds having vinyl groups as side chains]

A reaction vessel as described in Example 1 were charged with 146.2 g (1.0 mol) of adipic acid, 304.2 g (2.0 moles) of tetrahydrophtalic anhydride and 308.4 g (2.0 moles) of hexahydrophthalic anhydride as a mixture of a compound(b) and 2.5 g of dimethylbenzyl amine.

Temperature in the reaction vessel was raised while introducing nitrogen gas, followed by continuously stirring after solid starting materials began to melt and change to slurry state.

Temperature was further raised to 130° C. and heating was stopped, followed by dropwise addition of 816 g (6.0 moles) of vinylnorbornene monoxide as a compound(a) to allow reaction.

After completion of dropwise addition, aging in the reaction vessel was continued for 1 hour maintaining at 160° C. to obtain an epoxy group conversion of 99.9%.

A polymer having vinyl groups which has an iodine value of 128.5 (g/100 g) was obtained. The polymer was designated as [A-7].

The polymer[A-7] obtained was analyzed by $^1$H-NMR, $^{13}$C-NMR and FT-IR.

The spectra are assigned as described below.

| | |
|---|---|
| < $^1$H-NMR spectra > | |
| delta 5.0 ppm | due to proton of $CH_2$ in vinyl group |
| delta 5.6 ppm | due to proton of C=C in tetrahydrophthalic anhydride |
| delta 5.8–5.9 ppm | due to proton of CH in vinyl group |
| < $^{13}$C-NMR spectra > | |
| delta 113–114 ppm | due to carbon of $CH_2$ in vinyl group |
| delta 127 ppm | due to carbon of C=C in tetrahydrophthalic anhydride |
| delta 139–141 ppm | due to carbon of CH in vinyl group |
| delta 170–172 ppm | due to carbon of ester group |
| < IR spectra > | |
| 3500 $cm^{-1}$ | absorption due to OH group |
| 1730 $cm^{-1}$ | absorption due to ester group |
| 1640–910 $cm^{-1}$ | absorption due to vinyl group |

EXAMPLE 8

[Preparation of a composition (II) comprising compounds having vinyl groups as side chains]

A reaction vessel as described in Example 1, further equipped with a tube for replaying water were charged with 530 g of a polycaprolactone (having a molecular weight of 530) as a compound(c), 584.8 g (4.0 moles) of adipic acid as a compound(b) and 2.5 g of tri-n-octylamine and 50 ppm of tetrabutyltitanate.

Temperature in the reaction vessel was raised while introducing nitrogen gas, followed by continuously stirring after solid starting materials began to melt and change to slurry state.

Temperature was further raised to 130° C. and heating was stopped, followed by dropwise addition of 616 g (4.0 moles) of 1,2-epoxy-9-decene as a compound(a) to allow reaction.

After completion of dropwise addition, aging in the reaction vessel was continued for 1 hour maintaining at 145° C. to obtain an epoxy group conversion of more than 99.9%.

Furthermore, the temperature was raised to 180° C., and then the esterification under dehydrating was carried out while raising to from 180° C. to 200° C. over 2 hours.

Total dehydrated water was 72.9 g (theoretical amount: 72 g).

A polymer having vinyl groups which has an iodine value of 61.2 (g/100 g) was obtained. The polymer was designated as [A-8].

The polymer[A-8] obtained was analyzed by $^1$H-NMR, $^{13}$C-NMR and FT-IR.

The spectra are assigned as described below.

| < $^1$H-NMR spectra > | |
|---|---|
| delta 4.9–5.0 ppm | due to proton of $CH_2$ in vinyl group |
| delta 5.8–5.9 ppm | due to proton of CH in vinyl group |
| < $^{13}$C-NMR spectra > | |
| delta 114 ppm | due to carbon of $CH_2$ in vinyl group |
| delta 138 ppm | due to carbon of CH in vinyl group |
| delta 172–173 ppm | due to carbon of ester group |
| < IR spectra > | |
| 3500 $cm^{-1}$ | absorption due to OH group |
| 1730 $cm^{-1}$ | absorption due to ester group |
| 1640–910 $cm^{-1}$ | absorption due to vinyl group |

EXAMPLE 9

[Preparation of an epoxidized composition (XII)]

1000 g of ethyl acetate solution containing 45% g of the polymer [A-1] was charged into a reaction vessel equipped with a condenser, a reflux cooler, a dropwise funnel, a stirrer and a tube for supplying nitrogen gas. The dropwise funnel was charged with 392 g of ethyl acetate solution containing 30% of peracetic acid, followed by adding dropwise into the reaction vessel over 1 hour while maintaining the contents in the reaction vessel at 35° C.

After completion of the dropwise addition, the contents in the reaction vessel were aged while maintaining at 40° C. for 5 hours to obtain peracetic acid conversion of 97.5%.

The crude reaction solution obtained was washed with 1500 ml of 3% aqueous NaOH in twice and further washed with 1500 ml of distilled water, while maintaining at from 40° to 50° C.

After completion of washing with water, low boiling components were evaporated from the crude reaction solution with a thin layer evaporator under from 140° to 150° C. and less than 5 mm Hg to obtain an epoxidized composition having an epoxy equivalent of 300.

The epoxidized composition was designated as [B-1].

The epoxidized composition[B-1] obtained was analyzed with a gel permeation chromatograph(CR-4A) manufactured by Shimadzu Seisakusho, Ltd.

By the gel permeation chromatography analysis, it was confirmed that the composition has MN=1590(Standardization with polystyrene standard) and MW/MN=1.77. The epoxidized composition[B-1] obtained was analyzed by $^1$H-NMR, $^{13}$C-NMR and FT-IR.

Glass transition temperature of the epoxidized composition[B-1] was 55.3° C. The glass transition temperature was measured with DSC220 manufactured by Seiko Denshi Industries, Ltd., under nitrogen atmosphere and a temperature raising speed of 10° C./minute The characterization is described below.

< $^1$H-NMR spectra>

It was confirmed by $^1$H-NMR spectra assignments that absorptions due to vinyl group at delta 4.9–5.0 ppm and delta 5.8–5.9 ppm which were observed in [A-1] disappeared and an absorption due to an epoxy group at delta 2.6 ppm appeared, and further no other absorption changed.

< $^{13}$C-NMR spectra>

It was confirmed by $^{13}$C-NMR spectra assignments that absorption due to vinyl group at delta 113.3 ppm and delta 141.2 ppm which was observed in [A-1] disappeared and absorption due to an epoxy group at delta 46 ppm and delta 55 ppm appeared, and no further other absorption changed.

<FT-IR>

It was confirmed by FT-IR spectra assignments that absorption due to vinyl group at 1641 $cm^{-1}$ and 912 $cm^{-1}$ which was observed in [A-1] disappeared and an absorption due to an epoxy group at 869 $cm^{-1}$ appeared, and further no other absorption changed.

EXAMPLE 10

[Preparation of an epoxidized composition (XII)]

A reaction vessel as used in Example 9 was charged with 1000 g of ethyl acetate solution containing 45% of the composition [A-2], and a dropwise funnel was charged with 395 g of ethyl acetate solution containing 30% of peracetic acid and 0.05% by weight (based on peracetic acid) of potassium hexamethaphosphate, followed by dropwise addition of peracetic acid solution over 1 hour while maintaining the reaction vessel at 40° C.

Same procedures described in Example 9 were carried out to obtain an epoxidized composition having an epoxy value of 315 equivalents, MN=1979 (Standardization with polystyrene standard) and MW/MN=1.67. The epoxidized composition was designated as [B-2].

The epoxidized composition [B-2] obtained was analyzed by $^1$H-NMR, $^{13}$C-NMR and FT-IR. Glass transition temperature of the epoxidized composition [B-2] was 65.3° C. The characterization is described below.

< $^1$H-NMR spectra>.

It was confirmed by $^1$H-NMR spectra assignments that absorption due to vinyl group at delta 4.9–5.0 ppm and delta 5.8–5.9 ppm which was observed in [A-2] disappeared and an absorption due to an epoxy group at delta 2.6 ppm appeared, and further no other absorption changed.

< $^{13}$C-NMR spectrum>.

It was confirmed by $^{13}$C-NMR spectra assignments that absorption due to vinyl group at delta 113.3 ppm and delta 141.9 ppm which was observed in [A-2] disappeared and absorption due to an epoxy group at delta 46.5 ppm and delta 56.0 ppm appeared, and further no other absorption changed.

<FT-IR>

It was confirmed by FT-IR spectra assignments that absorption due to vinyl group at 1641 $cm^{-1}$ and 912 $cm^{-1}$ which was observed in [A-2] disappeared and an absorption due to an epoxy group at 869 cm$^{-1}$ appeared, and further no other absorption changed.

EXAMPLE 11

[Preparation of an epoxidized composition (XII)]

A reaction vessel as used in Example 9 was charged with 1000 g of ethyl acetate solution containing 35% of the composition [A-3], and a dropwise funnel was charged with 321 g of ethyl acetate solution containing 30% (0.6 fold mol based on vinyl group) of perbenzoic acid and 0.05% by weight (based on perbenzoic acid) of sodium dioctyl tripolyphosphate, followed by dropwise addition of perbenzoic acid solution over 1 hour while maintaining the reaction vessel at 40° C.

Same procedures described in Example 9 were carried out to obtain an epoxidized composition having an epoxy value of 558 equivalents, MN=2540 (Standardization with polystyrene standard) and MW/MN=1.98. The epoxidized composition was designated as [B-3].

The epoxidized composition[B-3] obtained was analyzed by $^1$H-NMR, $^{13}$C-NMR and FT-IR. Glass transition temperature of the epoxidized composition[B-3] was 55.3° C. The characterization is described below.

<$^1$H-NMR spectra>

It was confirmed by $^1$H-NMR spectra assignments that absorption due to vinyl group at delta 4.9–5.0 ppm and delta 5.8–5.9 ppm which was observed in [A-3] disappeared and an absorption due to an epoxy group at delta 2.6 ppm appeared, and further no other absorption changed.

<$^{13}$C-NMR spectra>

It was confirmed by $^{13}$C-NMR spectra assignments that absorption due to vinyl group at delta 113.3 ppm and delta 141.9 ppm which was observed in [A-3] disappeared and absorption due to an epoxy group at delta 46.3 ppm and delta 56.4 ppm appeared, and further no other absorption changed.

<FT-IR>

It was confirmed by FT-IR spectra assignments that absorption due to vinyl group at 1641 cm$^{-1}$ and 912 cm$^{-1}$ which was observed in [A-3] disapand an absorption due to an epoxy group at 869 cm$^{-1}$ appeared, and further no absorption changed.

EXAMPLE 12

[Preparation of an epoxidized composition(XII)]

A reaction vessel as used in Example 9 was charged with 800 g of ethyl acetate solution containing 60% of the composition [A-4], and a dropwise funnel was charged with 660 g of ethyl acetate solution containing 30% of perbenzoic acid and 0.05% by weight (based on perbenzoic acid) of sodium pyrophosphate, followed by dropwise addition of perbenzoic acid solution over 1 hour while maintaining the reaction vessel at 50° C.

Same procedures described in Example 9 were carried out to obtain an epoxidized composition having an epoxy value of 380 equivalents, MN=3570 (Standardization with polystyrene standard) and MW/MN=2.68.

The epoxidized composition was designated as [B-4].

The epoxidized composition[B-4] obtained was analyzed by $^1$H-NMR, $^{13}$C-NMR and FT-IR. Glass transition temperature of the epoxidized composition[B-4] was 62.5° C. The characterization is described below.

<$^1$H-NMR spectra>

It was confirmed by $^1$H-NMR spectra assignments that absorption due to vinyl group at delta 4.9–5.0 ppm and delta 5.8–5.9 ppm which was observed in [A-4] disappeared and an absorption due to an epoxy group at delta 2.6 ppm appeared, and further no other absorption changed.

<$^{13}$C-NMR spectra>

It was confirmed by $^{13}$C-NMR spectra assignments that absorption due to vinyl group at delta 113.2 ppm and delta 141.7 ppm which was observed in [A-4] disappeared and absorption due to an epoxy group at delta 46.3 ppm and delta 56.4 ppm appeared, and further no other absorption changed.

<FT-IR>

It was confirmed by FT-IR spectra assignments that absorption due to vinyl group at 1641 cm$^{-1}$ and 912 cm$^{-1}$ which was observed in [A-4] disappeared and an absorption due to an epoxy group at 869 cm$^{-1}$ appeared, and further no other absorption changed.

EXAMPLE 13

[Preparation of an epoxidized composition(XII)]

A reaction vessel as used in Example 9 was charged with 158 g of aqueous solution containing 70% of cumenhydroxyperoxide modified by 50 g of anhydrous magnesium sulfate, 1000 ml of toluene and 4.70 g of molybdenum dioxide diacetylacetonate.

800 g of toluene solution containing 30% of the composition[A-5] was charged into a dropwise funnel, followed by gradual dropwise addition to allow to react over 20 hours while maintaining the reaction vessel at 50° C. Unreacted cumenhydroxyperoxide was decomposed with sodium hydrosulphite and further toluene solution layer was dehydrated with anhydrous magnesium sulphate.

Same procedures described in Example 9 were carried out to obtain an epoxidized composition having an epoxy value of 370 equivalents, MN=2247 (Standardization with polystyrene-standard) and MW/MN=1.72.

The epoxidized composition was designated as [B-53].

The epoxidized composition[B-5] obtained was analyzed by $^1$H-NMR, $^{13}$C-NMR and FT-IR. The characterization is described below.

<$^1$H-NMR spectra>.

It was confirmed by $^1$H-NMR spectra assignments that an absorption due to vinyl group at delta 4.6–4.7 ppm which was observed in [A-5] disappeared and an absorption due to an epoxy group at delta 2.6 ppm appeared, and further no other absorption changed.

<$^{13}$C-NMR spectra>

It was confirmed by $^{13}$C-NMR spectra assignments that absorption due to vinyl group at delta 108.2 ppm and delta 148.3 ppm which was observed in [A-5] disappeared and absorption due to an epoxy group at delta 45.5 ppm and delta 5.62 ppm appeared, and further no other absorption changed.

<FT-IR>

It was confirmed by FT-IR spectra assignments that absorption due to vinyl group at 1650 cm$^{-1}$ and 890 cm$^{-1}$ which was observed in [A-5] disappeared and an absorption due to an epoxy group at 869 cm$^{-1}$ appeared, and no further other absorption changed.

EXAMPLE 14

[Preparation of an epoxidized composition(XI)]

A reaction vessel as used in Example 9 was charged with 193 g of aqueous solution containing 70% of tert-butanol modified by 50 g of anhydrous magnesium sulfate, 1000 ml of toluene and 5.50 g of molybdenum hexacarbonyl.

1000 g of toluene solution containing 40% of the composition [A-6] was charged into a dropwise funnel, followed by gradual dropwise addition to allow to react over 15 hours while maintaining the reaction vessel at 40° C. Unreacted tert-butanol was decomposed with sodium hydrosulphite and further toluene solution layer was dehydrated with anhydrous magnesium sulphate.

Same procedures described in Example 9 were carried out to obtain an epoxidized composition having an epoxy value of 296 equivalents, MN=2114 (Standardization with polystyrene standard) and MW/MN=2.02. The epoxidized composition was designated as [B-6].

The epoxidized composition [B-6] obtained was analyzed by $^1$H-NMR, $^{13}$C-NMR and FT-IR. The characterization is described below.

<$^1$H-NMR spectra>

It was confirmed by $^1$H-NMR assignments that an absorption due to vinyl group at delta 4.9–5.0 ppm which was observed in [A-6] disappeared and an absorption due to an epoxy group at delta 2.6 ppm appeared, and further no other absorption changed.

<$^{13}$C-NMR spectra>

It was confirmed by $^{13}$C-NMR assignments that absorption due to vinyl group at delta 114.0 ppm, delta 136.0 ppm and delta 148.3 ppm which was observed in [A-6] disappeared and absorption due to at, epoxy group at delta 45.8 ppm and delta 56.8 ppm appeared, and further no other absorption changed.

<FT-IR>

It was confirmed by FT-IR spectra assignments that absorption due to vinyl group at 1641 cm$^{-1}$ and 912 cm$^{-1}$ which was observed in [A-6] disappeared and an absorption due to an epoxy group at 869 cm$^{-1}$ appeared, and no further other absorption changed.

EXAMPLE 15

[Preparation of an epoxidized composition(XI)]

A reaction vessel as used in Example 9 was charged with 1000 g of diethylether solution containing 30% of the composition [A-7] and 800 ml of ethanol solution containing 400 ml of 35% aqueous hydroperoxide, followed by maintaining the reaction vessel at 25° C.

100 ml of NaOH(5 molarity) was added dropwise while vigorously stirring over 1 hour, resulting in raising to 25°–35° C.

The reaction solution was stirred for 3 hours while maintaining at 35° C. 800 ml of distilled water was added into the reaction solution, followed by extracting with 200 ml of diethylether three times.

Mixed diethylether solution was washed with 200 ml of distilled water two times, and further washed with 200 ml of an aqueous solution containing 5% of potassium iodide.

Same procedures as described in Example 9 were carried out to obtain an epoxidized composition having an epoxy value of 220 equivalents, MN=1545 (Standardization with polystyrene standard) and MW/MN=1.67.

The epoxidized composition was designated as [B-7].

The epoxidized composition[B-7] obtained was analyzed by $^1$H-NMR, $^{13}$C-NMR and FT-IR. The characterization is described below.

<$^1$H-NMR spectra>

It was confirmed by $^1$H-NMR that absorption due to vinyl group at delta 5.0 ppm, 5.8 ppm and 5.8–5.9 ppm which was observed in [A-7] disappeared and an absorption due to an epoxy group at delta 2.6 ppm appeared, and further no other absorption changed.

<$^{13}$C-NMR spectra>

It was confirmed by $^{13}$C-NMR that absorption due to vinyl group at delta 113.0–114.0 ppm, delta 127.0 ppm and delta 139–141.0 ppm which was observed in [A-7] disappeared and absorption due to an epoxy group at delta 45.8 ppm and delta 56.8 ppm appeared, and further no other absorption changed.

<FT-IR>

It was confirmed by FT-IR spectra that absorption due to vinyl group at 1649 cm$^{-1}$ and 910 cm$^{-1}$ which was observed in [A-7] disappeared and an absorption due to an epoxy group at 869 cm$^{-1}$ appeared, and no further other absorption changed.

EXAMPLE 16

[Preparation of an epoxidized composition(XII)]

A reaction vessel as used in Example 9 was charged with 800 g of a diethylether solution containing 40% of the composition [A-8] and 500 ml of an ethanol solution containing 200 ml of a 35% aqueous hydroperoxide, followed by maintaining the reaction vessel at 20° C.

60 ml of NaOH(5 molarity) was added dropwise while vigorously stirring over 1 hour, resulting in raising to 20°–30° C.

The reaction solution was stirred for 3 hours while maintaining at 30° C. 500 ml of distilled water was added into the reaction solution, followed by extracting with 150 ml of diethylether three times.

Mixed diethylether solution was washed with 150 ml of distilled water two times, and further washed with 150 ml of an aqueous solution containing 3% of potassium iodide.

Same procedures as described in Example 9 were carried out to obtain an epoxidized composition having an epoxy value of 460 equivalents, MN=1870 (Standardization with polystyrene standard) and MW/MN=2.15.

The epoxidized composition was designated as [B-8].

The epoxidized composition[B-8] obtained was analyzed by $^1$H-NMR, $^{13}$C-NMR and FT-IR. The characterization is described below.

<$^1$H-NMR spectra>

It was confirmed by $^1$H-NMR spectra assignments that absorption due to vinyl group at delta 4.9–5.0 ppm and 5.8–5.9 ppm which was observed in [A-8] disappeared and an absorption due to an epoxy group at delta 2.7 ppm appeared, and further no other absorption changed.

<$^{13}$C-NMR spectra>

It was confirmed by $^{13}$C-NMR spectra assignments that absorption-due to vinyl group at delta 114.0 ppm and delta 139 ppm which was observed in [A-8] disappeared and absorption due to an epoxy group at delta 45.8 ppm and delta 56.8 ppm appeared, and further no other absorption changed.

<FT-IR>

It was confirmed by FT-IR spectra assignments that absorption due to vinyl group at 1641 cm$^{-1}$ and 912 cm$^{-1}$ which was observed in [A-8] disappeared and an absorption due to an epoxy group at 869 cm$^{-1}$ appeared, and no further other absorption changed.

EXAMPLE 17

[Preparation of an epoxidized composition(XII)]

A reaction vessel as used in Example 9 was charged with 1000 g of an ethyl acetate solution containing 50% of the composition[A-1], followed by maintaining the solution at 60° C.

588 g of ethyl acetate solution containing 30%(molar ratio of 1.5 based on vinyl groups) of peracetic acid and 0.05 wt % (based on peracetic acid) of tetrapolyphosphoric acid were charged into a dropwise funnel, and gradually added dropwise into the reaction vessel while maintaining at 60° C. After completion of dropwise addition, the reaction solution was maintained at 60° C. for aging for 3 hours.

Same procedures as described in Example 9 were carried out to obtain an epoxidized composition having an epoxy value of 323 equivalents, MN=1590 (Standardization with polystyrene standard) and MW/MN=1.80.

The epoxidized composition was designated as [B-9].

EXAMPLE 18

[Preparation of an epoxidized composition (XII)]

A reaction vessel as used in Example 9 was charged with 1000 g of ethyl acetate solution containing 50% of the composition [A-1], followed by maintaining the solution at 60° C.

235 g of ethyl acetate solution containing 30% (molar ratio of 0.6 based on vinyl groups) of peracetic acid and 0.05 wt % (based on peracetic acid) of tetrapolyphosphoric acid were charged into a dropwise funnel, and gradually added dropwise into the reaction vessel while maintaining at 60° C. After completion of dropwise addition, the reaction solution was maintained at 60° C. for aging for 3 hours.

Same procedures as described in Example 9 were carried out to obtain an epoxidized composition having an epoxy value of 540 equivalents, an iodine value of 31, MN=1585 (Standardization with polystyrene standard) and MW/MN= 1.82. The epoxidized composition was designated as [B-10].

EXAMPLE 19

[Preparation of an epoxidized composition(XII)]

A reaction vessel as used in Example 9 was charged with 1000 g of ethyl acetate solution containing 50% of the composition [A-1], followed by maintaining the solution at 60° C.

118 g of ethyl acetate solution containing 30% (molar ratio of 0.3 based on vinyl groups) of peracetic acid and 0.05 wt % (based on peracetic acid) of tetrapolyphosphoric acid were charged into a dropwise funnel, and gradually added dropwise into the reaction vessel while maintaining at 60° C. After completion of dropwise addition, the reaction solution was maintained at 60° C. for aging for 3 hours.

Same procedures as described in Example 9 were carried out to obtain an epoxidized composition having an epoxy value of 1016 equivalents, an iodine value of 55, MN=1580 (Standardization with polystyrene standard) and MW/MN= 1.79. The epoxidized composition was designated as [B-11].

EXAMPLE 20

[Preparation of an unsaturated carboxylic ether composition(III) comprising compounds having vinyl groups]

130 g (1.0 mol) of 2-hydroxyethylmethacrylate as a compound(d), 372 g (3.0 moles) of 4-vinylcyclohexene-1-oxide as a compound(a) were charged into a jacketed reaction vessel having a capacity of 2 liter equipped with a reflux condenser, a dropwise funnel, a stirrer and a tube for supplying nitrogen gas.

Successively, 10% ethyl acetate solution containing 3.6 g of $BF_3$, etherate was added dropwise over 2 hours to allow to react while maintaining the reaction vessel at 50° C.

After completion of dropwise addition, it was confirmed by a gas-chromatography that 4-vinylcyclohexene-1-oxide almost disappeared.

Successively, 480 g of ethyl acetate was further added into a reaction solution, followed by washing with 500 g of water twice to obtain 958 g of ethyl acetate solution containing a solid content of 46.3%.

It was confirmed by a gas-chromatography that 2.1% of 2-hydroxyethylmethacrylate was contained in the reaction solution obtained.

Successively, 50 g of ethyl acetate solution obtained was charged into a round-bottom flask to be attached to a rotary evaporator to evaporate low boiling components under reduced pressures and jacket temperature of 50° C. to obtain 23 g of an unsaturated carboxylic composition(III) having vinyl groups which is a desired viscous composition having a viscosity of 3600 cp/25° C.

The composition was designated as [A-9].

The composition[A-9] obtained was analyzed by GPC [C-R4A: manufactured by Shimadzu Seisakusyo, Ltd.

It was confirmed that the composition [A-9] obtained is a mixture having a distribution composed of 2-hydroxyethylmethacrylate(n=0) not added by 4-vinylcyclohexeneoxide, a compound(n=1) added by 1 mol of 4-vinylcyclohexeneoxide, a compound(n=2) added by 2 mol of 4-vinylcyclohexeneoxide, . . . , and having MN=564 (Standardization with polystyrene standard) and MW/MN=1.35, by the GPC analysis.

Furthermore, $^1$H-NMR, $^{13}$C-NMR and IR analysis were carried out.

$^1$H-NMR, $^{13}$C-NMR analysis were carried out in $CDCl_3$ and at room temperatures, with JNM-EX90 analyzer manufactured by Nihon Denshi, Ltd.

The IR analysis was carried out by coating on a NaCl plate with IR-435 analyzer manufactured by Shimadzu Seisakusyo, Ltd.

The spectra are assigned as described below.

| < $^1$H-NMR spectra > | |
| --- | --- |
| delta 1.0–2.1 (22.2 H) | due to proton of $CH_2$ in cyclohexane ring |
| delta 1.96 (3.0 H) | due to proton of $CH_3$ in methacrylic group |
| delta 2.1–2.7 (3.7 H) | due to proton of CH to which a vinyl group bonds, in cyclohexane ring |
| delta 2.7–2.9 (1.0 H) | due to proton of OH |
| delta 3.1–4.1 (9.4 H) | due to proton of CH to which oxygen bonds, in cyclohexane ring due to proton of methylene group to which oxygen bonds, in $CH_2CH_2O$ |
| delta 4.2–4.4 (2.0 H) | due to proton of $CH_2$ in ester bond |
| delta 4.8–5.2 (7.4 H) | due to proton of $CH_2$ in vinyl group |
| delta 5.5–6.1 (7.4 H) | due to proton of CH in vinyl group |
| delta 5.58 (1.0 H) | due to one proton of $CH_2$= in methacrylic group |
| delta 6.14 (1.0 H) | due to another proton of $CH_2$= in methacrylic group |
| < $^{13}$C-NMR spectra > | |
| delta 18.2 | due to carbon of $CH_3$ in methacrylic group |
| delta 24–37 | due to carbon of CH and $CH_2$ to which oxygen does not bond, in cyclohexane ring |
| delta 61–72 | due to carbon of $CH_2CH_2O$ by ester bond |
| delta 72–84 | due to carbon of CH to which oxygen bonds, in cyclohexane ring |
| delta 112–115 | due to carbon of $CH_2$ in vinyl group |
| delta 125.7 | due to one carbon of $CH_2$= in methacrylic group |
| delta 136.1 | due to another carbon of $CH_2$= in methacrylic group |
| delta 141–145 | due to carbon of CH in vinyl group |
| delta 167.3 | due to carbon in ester group |
| < IR spectra > | |
| 903 $cm^{-1}$ | absorption due to vinyl group |
| 1718 $cm^{-1}$ | absorption due to ester group in methacryl ester | n=approximately 3.7 was confirmed by the $^1$H-NMR spectra assignments.

n is an average mol number of 4-vinylcyclohexene-1-oxide added to 2-hydroxyethylmethacrylate.

EXAMPLE 21

[Preparation of an epoxidized composition(XIII)]

400 g ethyl acetate solution containing 46.3% of the composition [A-0] obtained in Example 20 was charged into a jacketed reaction vessel having a capacity of 2 liter equipped with a reflux condenser, a dropwise funnel from which peracetic acid is charged, a stirrer and a tube for supplying nitrogen gas.

Successively, the dropwise funnel was charged with 280 g of ethyl acetate solution containing 30% of peracetic acid and 0.2 g of sodium 2ethylhexyl tripolyphosphate was added to dissolve.

The ethyl acetate solution of peracetic acid was added dropwise into the reaction vessel over approximately 4 hours while maintaining the reaction temperature of 50° C., additionally followed by maintaining at 50° C. over 6 hours.

Successively, 680 g of purified water was added and stirred for 30 minutes, followed by settling at 50° C. to separate into two solution layers.

After maintaining for 30 minutes at 50° C., the separated lower solution layer was gradually removed, followed by adding 300 g of ethyl acetate and 800 g of a purified water.

After stirring for 30 minutes and settling for 30 minutes at 50° C., followed by removing lower solution layer.

Further, 700 g of a purified water was added and stirred for 30 minutes at 50° C., followed by settling for 30 minutes at 50° C. to separate into two solution layers.

The separated lower solution layer was gradually removed to obtain 650 g of ethyl acetate solution having solid content of 30.1%.

It was confirmed by a gas-chromatography analysis that 0.9% of unreacted 2-hydroxyethylmethacrylate remained in the ethyl acetate solution obtained.

Successively, the upper layer solution was charged into a thin-layer evaporator under the conditions of 50° C., from 20 to 50 mm Hg and 300 cc/hour to obtain 180 g of an unsaturated carboxylic ester composition having epoxy groups which is a desired product.

The unsaturated carboxylic ester composition having the following properties was designated as [B-12]

| APHA | 50 |
|---|---|
| oxirane oxygen | 7.03 |
| acid value (mg KOH/g) | 0.9 |
| viscosity (cc/25° C.) | 9900 |

The unsaturated carboxylic ester composition having epoxy groups [B-12] was analyzed by NMR and IR to obtain the following spectra.

The spectra are assigned as described below.

< $^1$H-NMR spectra >

| delta 1.0–2.2 ppm (29.7 H) | due to proton of $CH_2$ in cyclohexane ring and proton of CH to which an epoxy group bonds, in cyclohexane ring |
|---|---|
| delta 1.95 ppm (3.0 H) | due to proton of $CH_3$ in methacrylic group |
| delta 2.2–3.0 ppm (10.5 H) | due to proton of CH to which a vinyl group bonds, in cyclohexane ring |
| delta 3.0–4.1 ppm (10.8 H) | due to proton of CH to which oxygen bonds, in cyclohexane ring due to proton of methylene group to which oxygen bonds, in $CH_2CH_2O$ and due to OH group |
| delta 4.2–4.4 ppm (2.0 H) | due to proton of $CH_2$ in ester bond |
| delta 4.8–5.2 ppm (1.2 H) | due to proton of $CH_2$ in vinyl group |
| delta 5.5–6.1 ppm (0.6 H) | due to proton of CH in vinyl group |
| delta 5.58 ppm (1.0 H) | due to one proton of $CH_2$= in methacrylic group |
| delta 6.12 ppm (1.0 H) | due to another proton of $CH_2$= in methacrylic group |

< $^{13}$C-NMR spectra >

| delta 18.2 ppm | due to carbon of $CH_3$ in methacrylic group |
|---|---|
| delta 22–36 ppm | due to carbon of CH and $CH_2$ to which oxygen does not bond, in cyclohexane ring |
| delta 45–47 ppm | due to carbon of $CH_2$ in epoxy group |
| delta 54–57 ppm | due to carbon of CH in epoxy group |
| delta 61–72 ppm | due to carbon of $CH_2CH_2O$ by ester bond |
| delta 72–84 ppm | due to carbon of CH in which oxygen bonds, in cyclohexane ring |
| delta 112–115 ppm | due to carbon of $CH_2$ in vinyl group |
| delta 125.6 ppm | due to one carbon of $CH_2$= in methacrylic group |
| delta 136.2 ppm | due to another carbon of $CH_2$= in methacrylic group |
| delta 141–145 ppm | due to carbon of CH in vinyl group |
| delta 167.2 ppm | due to carbon of ester group |

< IR spectra >

| 859 $cm^{-1}$ | absorption due to epoxy group |
|---|---|
| 1715 $cm^{-1}$ | absorption due to ester group in methacrylic ester |

It was confirmed by the assignments of $^1$H-NMR spectra that averaged addition mol numbers of cyclohexene-1-oxide units having substituted groups to 2-hydroxyethylmethacrylate are approximately 3.9.

Furthermore, the conversion of vinyl group to epoxy group was approximately 85%.

EXAMPLE 22

[Preparation of an unsaturated carboxylic ether compositio-n(III) comprising compounds having vinyl groups and then an epoxidized composition(XIII)]

300 g of toluene and ]4 g of benzyl triethyl ammonium as a catalyst were charged into a flask equipped with a stirrer, a tube for supplying nitrogen gas and a dropwise funnel, followed by heating at 80° C.

200 g of 1,2-epoxy-9-decene, 112 g of methacrylic acid and 0.1 g of p-methoxy phenol were charged into the dropwise funnel, followed by dropwise addition into the flask while maintaining at 80° C. over 10 hours to allow to react.

The reaction was stopped at an epoxide conversion of 95%, followed by washing and separating with 200 g of water twice to obtain 534 g of an unsaturated carboxylic composition(III) having vinyl groups.

Successively, 500 g of the composition obtained above was charged into a 2-liter reaction vessel equipped with a condenser, a tube for supplying nitrogen gas and a dropwise funnel in which 300 g of ethyl acetate solution containing 30% of peracetic acid in which 0.2 g of sodium 2-ethylhexyl tripolyphosphate was dissolved were charged, followed by dropwise addition while heating at 50° C. over 4 hours, and then aging for 5 hours to complete the reaction, followed by washing and separating with 800 g of water thrice and evaporating an organic solution layer with a thin-layer evaporator to obtain 262 g of an unsaturated carboxylic composition(XIII) having epoxy groups.

The composition exhibited the following properties.

| oxirane oxygen | 6.20 |
| --- | --- |
| acid value (mg KOH/G) | 2.2 |
| viscosity (cc/25° C.) | 40 |

EXAMPLE 23

[Preparation of a radically copolymerized composition comprising compounds having epoxy groups in which the composition(XIII) is copolymerized]

70 g of xylene and 3 g of perbutyl Z were charged into a flask equipped with a stirrer, a reflux condenser and a tube for supplying nitrogen gas, followed by heating at approximately 110° C.

Successively, a mixture composed of 50 g of the composition obtained in Example 21, 50 g of styrene as monomers and 2.5 g of perbutyl O as an initiator was added dropwise into the above xylene solution over 3 hours under nitrogen atmosphere, and further allowed to react for 10 hours to obtain 160 g of a desired copolymer solution.

The copolymer solution was a transparent liquid having a number average molecular weight of 5200, an epoxy value of 720 equivalents and a solid content of 59%.

The copolymer solution was designated as resin solution [R-1].

EXAMPLE 24

[Preparation of a radically copolymerized composition comprising compounds having epoxy groups in which the composition(XIII) is copolymerized]

67 g of xylene and 2.5 g of perbutyl Z were charged into a flask equipped with a stirrer, a reflux condenser and a tube for supplying nitrogen gas, followed by heating at from 110° to 120° C.

Successively, a mixture composed of 50 g of the composition obtained in Example 22, 38 g of methylmethacrylate, 12 g of ethylhexylacrylate as monomers and 2.5 g of perbutyl O as an initiator was added dropwise into the above xylene solution over 3 hours under nitrogen atmosphere, and further allowed to react for 7 hours to obtain 165 g of a desired copolymer solution.

The copolymer solution was a transparent liquid having a number average molecular weight of 6500, an epoxy value of 860 equivalents and a solid content of 61%.

The copolymer solution was designated as resin solution [R-2].

EXAMPLE 25

[Preparation of a radically polymerized composition comprising compounds having epoxy groups in which the composition(XIII) is polymerized]

70 g of xylene and 2.5 g of perbutyl Z were charged into a flask equipped with a stirrer, a reflux condenser and a tube for supplying nitrogen gas, followed by heating at from 110° to 20° C.

Successively, a mixture composed of 100 g of the composition obtained in Example 22 as a monomer and 3 g of perbutyl O as an initiator was added dropwise into the above xylene solution over 3 hours under nitrogen atmosphere, and further allowed to react for 7 hours to obtain 165 g of a desired polymer solution.

The polymer solution was a transparent liquid having a number average molecular weight of 4000, an epoxy value of 440 equivalents and a solid content of 60%.

The copolymer solution was designated as resin solution [R-3].

Application Example 1

[Tests for powder coatings with the epoxidized compositions obtained in Examples 9–12 and a carboxyl-terminated polyester resin]

The epoxidized compositions obtained in Examples 9–12 were used for preparing powder coating compositions.
<Preparation I of a polyester resin>

2383 parts of diethylene glycol, 4037 parts of cyclohexane dicarboxylic acid and 0.07 parts of tetrabutyl titanate were charged into a 4-necked reaction vessel equipped with a stirrer, a thermometer, a tube for supplying nitrogen gas and a condenser equipped with a tube for dehydration, followed by being heated and then by initiating of dehydration at the period of the temperature of approximately 140° C.

The temperature raised to 220° C. with the progress of dehydration.

The reaction was stopped at the amount of dehydrated water of 805 parts to obtain a polyester resin having an acid value of 20(KOH/g).

The polyester resin was designated as [P-1].
<Preparation II of a polyester resin>

Same procedures as described above was repeated, except that 2080 parts of neopentyl glycol, 3066 parts of adipic acid and 0.05 parts of tetrabutyl titanate were charged to obtain a polyester resin having an acid value of 34.6(KOH/g) at the amount of dehydrated water of 720 parts.

The polyester resin was designated as [P-2].
<Preparation III of a polyester resin>

Same procedures as described above was repeated, except that 767 parts of 1,6-hexanediol, 1095 parts of adipic acid and 0.02 parts of tetrabutyl titanate were charged to obtain, a polyester resin having an acid value of 70.2(KOH/g) at the amount of dehydrated water of 234 parts.

The polyester resin was designated as [P-3].
<Preparation of powder coating compositions>

The resulting polyester resins [P-1] to [P-3] obtained, a commercially supplied polyester resins (P2400 having an acid value of 37 and a glass transition temperature of 63° C. supplied by DSM Resin, Ltd., designated as [P-4] and Upicacoat GV-610 having softening temperature of 90 C., an acid value of 52 supplied by Japan Upica, Ltd., designated as [P-5], and the epoxidized compositions from [B-1] to [B-3] obtained and Modaflow Powder-II as a flow control agent (supplied by Monsanto Chemicals Co., Ltd.) and benzoin as a deaerating agent and titanium oxide and triphenyl phosphine as a curing catalyst were mixed with a Brabender type mixer at temperatures of from 75 to 85 C., respectively in the mixing ratio of as described in Table 1, followed by being crushed after cooling to obtain a powder coating composition, respectively.

For references, a bisphenol A type epoxy resin (Epikote 1004 supplied by Yuka Shell, Ltd.), triglycidyl isocyanurate(Araldite PT-810 supplied by Chiba-Geigy Co., Ltd.) and an alicyclic epoxy resin (EHPE-3150 supplied by Daicel Chemical Industries, Ltd.) were mixed as described above, respectively in the mixing ratio of as described in Table 1, followed by being crushed after cooling to obtain a powder coating composition, respectively.
<Powder coating layers test>

Successively, the resulting powder coating compositions were coated onto mild steel plates processed by zinc phosphate, respectively, by an electrostatic coating process, followed by curing at a temperature of 180 C. for a period of 50 minutes to obtain coating layers having a thickness of 45 microns.

TABLE 1

| polyester resin | P-1 | P-2 | P-3 | P-4 | P-5 | P-4 | P-4 | P-4 | P-4 |
|---|---|---|---|---|---|---|---|---|---|
|  | 89 | 84 | 77 | 81 | 77 | 80 | 93 | 70 | 88 |
| epoxy resin | B-1 | B-2 | B-3 | B-3 | B-4 | B-4 | E-1 | E-2 | E-3 |
|  | 11 | 16 | 23 | 19 | 23 | 20 | 7 | 30 | 12 |
| smoothness | E | E | E | E | E | E | M | E | E |
| glossiness | E | E | E | E | E | E | E | M | E |
| solvent resistance | E | E | E | E | E | E | E | M | E |
| storage stability | E | E | E | E | E | E | E | M | E |
| outdoor durability | E | E | E | E | E | E | E | B | E |
| blocking | E | E | E | E | E | E | E | E | B |

Note:
(1) Triphenyl phosphine, Modaflow Powder-II, benzoin and titanium oxide were mixed in the mixing ratio of 0.5 parts, 1 part, 0.3 part and 50 parts, respectively.

(2) E-1, E-2 and E-3 correspond to Araldite PT-810, Epikote 1004 and EHPE-3150, respectively.

(3) E, M and B in solvent resistance tests represent no-scratch/no-frosting, slightly frosting and scratch/frosting, respectively.

The solvent resistance tests were carried out by strong abrasion of twenty times on the coating layers of 10 cm length with a gauze in which xylene is saturated.

(4) E and M in storage stability tests represent no-change and slight change, respectively.

The storage stability tests were evaluated by a change of melting viscosity in the powder coating compositions after storing for one-month in 40° C.

(5) E, M and B in outdoor durability tests represent no-change, slightly-yellowing and yellowing, respectively.

The outdoor durability tests were evaluated by a change of color in the coating layers after exposing for 500 hours in a Sunshine Weather-Ometer.

(6) E, M and B in blocking tests represent no-blocking, slightly-blocking and blocking, respectively.

The blocking was evaluated by outer appearances in the powder coating compositions after storing for one month in 40° C.

Application Example 2

[Tests for powder coatings with the epoxidized compositions obtained in Examples 9–12 and a phenol novolak resin]
<Preparation of powder coating compositions>

Respective 1 equivalent of the epoxidized compositions from [B-1] to [B-4] obtained in Examples from 9 to 12, 1.1 equivalent of commercially supplied phenol novolak resin as a curing agent, 0.7 wt %(based on the total resins) of 2-undecylimidazole as an accelerator for curing, 150 parts (based on 100 parts of the total resins) of titanium oxide as a pigment and 30 parts (based on 100 parts of the total resins) of silica powder as an inorganic filler were mixed with a mixer, followed by being melted and mixed with a Brabender type mixer at temperatures of from 65 to 80 C., and further being crushed with a crusher after cooling to obtain powder coating compositions having an average particle sizes range of from 80 to 100 microns.

Furthermore, for references, a bisphenol A type epoxy resin (Epikote-1004 supplied by Yuka-Shell, Ltd.) and an alicyclic epoxy resin (EHPE-3150 supplied by Daicel Chemical Industries, Ltd.) were mixed as described above, respectively in the mixing ratio of as described in Table 2, followed by being crushed after cooling to obtain a powder coating composition, respectively.

<Powder coating layers test>

Successively, the resulting powder coating compositions were coated onto mild steel plates processed by zinc phosphate, respectively, by an electrostatic coating process, followed by curing at a temperature of 180 C. for a period of 50 minutes to obtain coating layers having a thickness of 45 microns. The results are shown in Table 2.

TABLE 2

| epoxy resin | B-1 | B-2 | B-3 | B-4 | Epikote-1004 | EHPE-3150 |
|---|---|---|---|---|---|---|
| smoothness | E | E | E | E | M | E |
| glossiness | E | E | E | E | G | E |
| solvent resistance | G | G | E | G | B | E |
| water resistance | M | G | E | E | B | E |
| glossiness retention | 92 | 96 | 98 | 99 | 86 | 95 |
| outdoor durability | G | G | G | E | M | G |
| storage stability | E | E | E | E | M | E |
| blocking property | E | E | E | E | M | B |

Note:
(1) E, G, and B in solvent resistance tests represent no-scratch/no-frosting, slightly frosting and scratch/frosting, respectively.

The solvent resistance tests were carried out by strong abrasion of twenty times on the coating layers of 10 cm length with a gauze in which xylene 1is saturated.

(2) E, G, M and B in water resistance tests represent no-frosting/no-blistering, slightly frosting, slightly-blistering/slightly-frosting and frosting/blistering, respectively.

The water resistance was evaluated by observation of the surface layers after 240 hours immersing in a water reservoir constantly maintained at 50° C. The glossiness retention values (%) were calculated by glossiness values measured with a glossiness tester before and after immersing.

(3) E, G and M in outdoor durability tests represent no-change, slightly-yellowing and yellowing, respectively.

The outdoor durability was evaluated by a change of color in the coating layers after exposing for 500 hours in a Sunshine-Weather-Ometer.

(4) E and M in storage stability tests represent no-change and slight change, respectively. The storage stability tests were evaluated by a melting viscosity as a fluidity in the powder coating compositions after storing for one-month in 40° C.

(5) E, M and B in blocking tests represent no-blocking, slightly-blocking and blocking, respectively.

The blocking was evaluated by outer appearances in the powder coating compositions after storing for one-month in 40° C.

Application Example 3

[Tests for encapsulating compositions with the epoxidized compositions obtained in Examples 9 and 11 and an acid anhydride]

The epoxy compositions [B-1] and [B-2] were mixed with 4-methylhexahydrohthalic anhydride(Rikacid MH-700 manufactured by Shin-Nihon Rika, Ltd.) as a curing agent and benzyl dimethylamine as a catalyst for curing in the mixing ratio as described hereinafter;

| Epoxy composition | 1.0 equivalent |
|---|---|
| MH-700 | 0.9 equivalent |
| benzyl dimethylamine | 0.5% by weight (based on the total weight) | followed by being melted and mixed in 120° C. for 5 minutes, and successively being defoamed under reduced pressures and further cured in a mold to obtain cured articles.

Precuring was carried out at 120° C. for 1 hour, and postcuring was further carried out at 160° C. for 6 hours in an oven.

Outer appearances, hardness and heat distortion temperatures of the cured articles obtained are shown in Table 3.

Heat distortion temperatures were measured based on JIS-K-6911.

Furthermore, for reference, same procedures as described above were repeated, except that a commercially supplied bisphenol A diglycidyl ether(Epikote 828 manufactured by Yuka-Shell, Ltd.) and cresol novolak epoxy resin (Epotode YDCN-702 manufactured by Toro Kasei, Ltd.) were used in place of the present compositions

TABLE 3

| Epoxy composition or Epoxy resin | B-1 | B-3 | Epikote 828 | YDCN-702 |
|---|---|---|---|---|
| Rockwell hardness (M scale) | 106 | 107 | 105 | 114 |
| Heat distortion temperature (°C.) | 195 | 250 | 145 | 190 |
| Transparency (by naked eye) | colorless transparent | colorless transparent | brown transparent | brown transparent |

Table 3 clearly shows that the present epoxy compositions for encapsulating are useful, particularly, for light emitting or receiving devices because of its excellent transparency and heat distortion temperatures without a loss of mechanical properties.

Application Example 4

[Tests for encapsulating compositions with the epoxidized compositions obtained in Examples 10 and 11 and a novolak type phenol resin]

Respective 150 parts by weight of the epoxy compositions [B-2], [B-3] and 50 parts by weight of a novolak type phenol resin (PSF-4300 manufactured by Gun-ei Chemical Industries, Ltd.) and 1 part by weight of 2-undecylimidazole(C11Z manufactured by Shikoku Kasei Industries, Ltd.) were mixed with 400 parts by weight of a fused silica powder under ordinary temperatures, followed by being kneaded under from 90° to 95° C. and then by being crushed after cooling thereof to obtain a molding composition.

The molding composition obtained was tabletized, followed by being preheated and then being molded with a transfer molding machine equipped with a die heated under 170° C. and cooled to obtain a cured article.

Furthermore, for reference, same procedures as described above were repeated except that 100 parts by weight of a cresol novolak type epoxy resin (epoxy equivalent value of 201) was used in place of the epoxy compositions of the present invention.

Results are shown in Table 4.

TABLE 4

| Epoxy composition or Epoxy resin | B-2 | B-3 | cresol novolak type epoxy |
|---|---|---|---|
| Flexural strength (kg/mm$^2$ at 20° C.) | 15.3 | 15.6 | 13.0 |
| Flexural strength (kg/mm$^2$ at 150° C.) | 8.0 | 8.5 | 6.7 |
| Flexural modulus of elasticity (kg/mm$^2$ at 20° C.) | 1520 | 1520 | 1500 |
| Flexural modulus of elasticity (kg/mm$^2$ at 150° C.) | 780 | 790 | 780 |
| Glass transition temperature (°C.) | 160 | 165 | 160 |
| Thermal cycle resistance test (cracked pieces/tested pieces) | 0/20 | 0/20 | 1/20 |
| Pressure-cooker test (hour) | 1000 | 1100 | 600 |

Note:

(1) In the Thermal cycle resistance tests, cracked numbers were counted relating to tested pieces in which a copper plate having 25L×25W×3t(mm) was encapsulated in the respective cured articles having 30L×25W×5t(mm), which pieces were placed in thermostatically controlled ovens maintained at −40° C. and +200° C., respectively, with 15 cycles at 30 minutes interval.

(2) In the Pressure-cooker test, an electric device having 2 aluminum wires was encapsulated in the molding compositions at 170° C. for 3 minutes with a transfer molding machine, followed by curing at 180° C. for 8 hours. And then, 100 pieces of the electric devices were placed in under a high pressure steam atmosphere of 120° C.

The period of time (hour) through which a breaking down of the wire occurs in 50% of 100 pieces was measured.

The Table 4 clearly shows that the present epoxy compositions are more excellent in heat resistance, moisture heat resistance and flexural strength.

Application Example 5

[Tests for a solder resist composition with the epoxidized composition obtained in Example 10, and dicyandiamide and imidazoles]

150 parts by weight of the epoxy composition [B-1], 6 parts by weight of dicyandiamide, 0.7 part by weight of 2-ethyl-4-methylimidazole, 10 parts by weight of talc, 40 parts by weight of diethyleneglycol monoethylacetate and a green-colored dye were kneaded with a roller having three rolls, followed by being kneaded to obtain a solder resist ink.

The composition was cured at 150° C. and for 80 minutes to obtain a cured article.

Application Example 6

[Tests for a solder resist composition with the epoxidized composition obtained in Example 11, and bisphenol A and imidazoles]

150 parts by weight of the epoxy composition [B-1], 70 parts by weight of bisphenol A, 1 part by weight of 2-ethyl-4-methylimidazole, 10 parts by weight of silica, 50 parts by weight of diethyleneglycol monoethylacetate and a green-colored dye were kneaded with a roller having three rolls, followed by being kneaded to obtain a solder resist ink.

The composition was cured at 120° C. and for 10 minutes to obtain a cured article. The results in the Application Examples 5 and 6 are collectively shown in Table 5.

TABLE 5

|  | Application Examples | |
|---|---|---|
|  | 5 | 6 |
| Heat distortion temperature (°C.) | 175 | 195 |
| Volume resistivity (ohm · cm/25° C.) | $6 \times 10^5$ | $5 \times 10^5$ |
| Dielectric constant (at 25° C. and 10 KHz) | 3.5 | 3.8 |

Application Examples 7–11 and Comparative Application Example 1

[Preparation of a curable composition comprising a radically polymerized composition comprising compounds having epoxy groups in which the composition(XIII) is polymerized and a cationic polymerization initiator][R-1], [R-2] and [R-3] as a radically polymerized composition and [ER-1], [ER-2], [ER-3], [ER-4] and [ER-5] as described below;

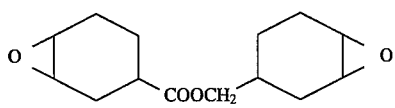

[ER-1]

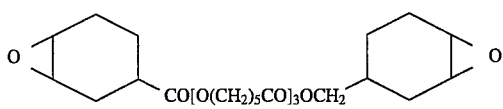

[ER-2]

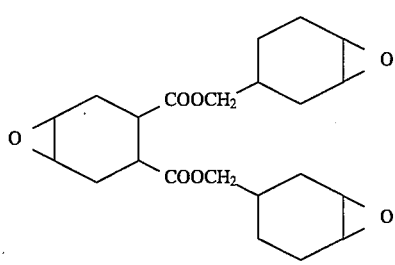

[ER-3]

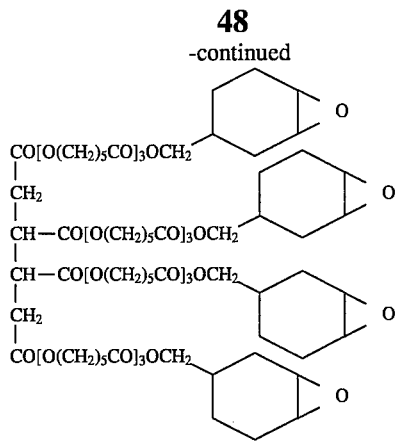

[ER-4]

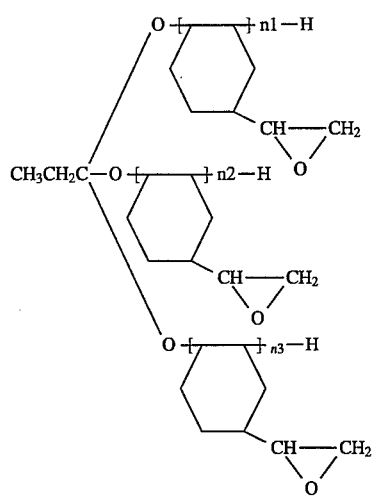

[ER-5]

(wherein, n1 + n2 + n3 = average 7)

as an epoxy resin having at least one epoxy group which is an optional component were mixed with a cationic polymerization initiator which includes trisacetylacetonate aluminum [TAAA], trisethylacetate aluminum[TEA-ACA], triphenyl(o-nitrobenzyloxy) silane [TPONBS], t-butyl-diphenyl(5-methyl-2-nitrobenzyloxy)silane [TBDPH] and Degacure K-126 [manufactured by Degussa AG], respectively, in the mixing ratio as shown in Table 6.

The mixed compositions were coated on, a glass plate in the thickness of 50 g/m² (wet), followed by heating to evaporate solvents by irradiation with a metal halide lamp having 80 W/cm, keeping a irradiation distance of 6.5 cm for 100 seconds, further being aged at room temperatures for 1 week.

The results are also shown in Table 6.

TABLE 6

|  | Application Examples | | | | | Comparative Application Example 1 |
|---|---|---|---|---|---|---|
|  | 7 | 8 | 9 | 10 | 11 | |
| Resin solution | | | | | | |
| [R-1] | 100 | | | 50 | 100 | 100 |
| [R-2] | | 50 | | | | |
| [R-3] | | | 20 | | | |
| Epoxy resin | | | | | | |
| [ER-1] | 50 | | | | | 50 |
| [ER-2] | | 50 | | | | |
| [ER-3] | | | | 100 | | |
| [ER-4] | | | 100 | | | |

TABLE 6-continued

|  | Application Examples | | | | | Comparative Application |
|---|---|---|---|---|---|---|
|  | 7 | 8 | 9 | 10 | 11 | Example 1 |
| [ER-5] Initiator |  |  |  |  |  | 20 |
| TAAA | 0.5 |  |  | 0.1 |  |  |
| TEAACA |  | 2.0 |  |  |  | 1.0 |
| TPONBS | 1.0 |  |  | 0.4 |  |  |
| Degacure K126 |  |  | 2.0 |  |  |  |
| Gel fraction (%) | 98 | 99 | 99 | 100 | 95 | 0 |
| Clinging ability | G | G | G | G | G | B |

Application Examples 12–15 and Comparative Application Example 2

[Preparation of a curable composition comprising a radically polymerized composition comprising compounds having epoxy groups in which the composition(XIII) is polymerized and a cationic polymerization initiator]

[R-1], [R-2] and [R-3] as a radically polymerized composition and

[ER-1], [ER-4] as described hereinabove and [ER-6] as described below;

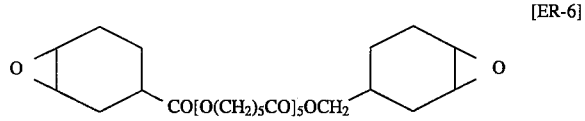
[ER-6]

as an epoxy resin having at least one epoxy group which is an optional component were mixed with a cationic polymerization initiator which includes trisethylacetoacetate aluminum [TEAACA], diphenyl silanediol [DSD], diphenyldimethoxy silane[DDMS] and aniline/borontrifluoride complex[ABTFC], respectively, in the mixing ratio as shown in Table 7.

The mixed compositions were coated on a glass plate in the thickness of 50 g/m² (wet), followed by heating at 80° C. and for 3 minutes to evaporate solvents and postcured at temperatures as shown in Table 6, further being aged at room temperatures for 1 week.

The results are also shown in Table 7.

TABLE 7

|  | Application Examples | | | | Comparative Application |
|---|---|---|---|---|---|
|  | 12 | 13 | 14 | 15 | Example 2 |
| Resin solution |  |  |  |  |  |
| [R-1] | 100 |  |  | 100 | 100 |
| [R-2] |  | 50 |  |  |  |
| [R-3] |  |  | 20 |  |  |
| Epoxy resin |  |  |  |  |  |
| [ER-1] | 20 |  |  | 50 | 20 |
| [ER-6] |  | 100 |  |  |  |
| [ER-4] |  |  | 50 |  |  |
| Initiator |  |  |  |  |  |
| [TEAACA] | 1.0 | 0.5 | 0.1 | 2.0 |  |
| [DSD] | 2.0 |  | 0.2 |  | 2.0 |
| [DDMS] |  |  | 4.0 |  |  |
| [ABTFC] |  | 1.0 |  |  |  |
| post curing | — | 140 | 50 | 140 | 140 |
| temperature (°C.) |  |  |  |  |  |
| time (minute) | — | 60 | 120 | 5 | 60 |
| Gel fraction (%) | 96 | 100 | 100 | 97 | 0 |
| Clinging ability | G | G | G | G | B |

Note:

In the Application Examples 7–15 and Comparative Application

Examples 1 and 2, the Gel fraction tests were carried out at 20° C. and 65% relative humidity, as undissolving amounts after 24 hours immersion in tetrahydrofuran.

The clinging ability tests were carried out at 20° C., 65% relative humidity, as strippability in cross-cut tests with adhesive tapes. In the clinging ability tests, Gs represent "Good" and Bs represent "Bad".

While the invention has been described in detail and with reference to specific embodiments thereof, it will be apparent to one skilled in the art that various changes and modifications can be made therein without departing, from the spirit and scope thereof.

What is claimed is:

1. An epoxy composition prepared by epoxidizing a composition consisting essentially of compounds having vinyl groups as side chains, said compounds being obtained by reacting (a) with (d); wherein (a) is at least one compound having at least one vinyl group and one epoxy group in the molecule and (d) is an unsaturated monocarboxylic ester having a hydroxyl group or a lactone modified unsaturated monocarboxylic ester having a hydroxyl group wherein said epoxidation is carried out by reaction of the vinyl groups with peracid or hydroperoxide.

2. An epoxy composition as set forth in claim 1, wherein said compound(a) is 4-vinylcyclohexene-1-oxide.

3. An epoxy composition as set forth in claim 1, wherein said compound(a) is 5-vinylbicyclo[2.2.1]hepto-2-en-2-oxide.

4. An epoxy composition as set forth in claim 1, wherein said compound(a) is limoneneoxide.

5. An epoxy composition as set forth in claim 1, wherein said compound(a) is a compound represented by the formula:

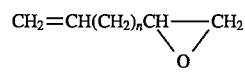

wherein, n is an integer of from 0 to 30.

6. An epoxy composition as set forth in claim 1, wherein said compound(a) is a compound represented by the formula:

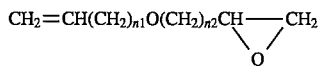

wherein, n1 and n2 are an integer of from 0 to 30, respectively.

7. An epoxy composition as set forth in claim 1, wherein said compound(a) is a compound represented by the formula:

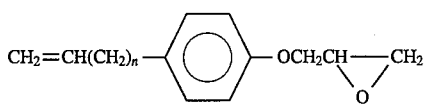

wherein, n is an integer of from 0 to 30.

8. An epoxy composition as set forth in claim 1, wherein said monomer (d) is at least one of 2-hydroxyethyl(meth)acrylate, 2-hydroxypropyl(meth)acrylate and 2-hydroxybutyl(meth)acrylate.

9. An epoxy composition as set forth in claim 1, wherein said compound(d) is at least one of a lactone-modified 2-hydroxyethyl(meth)acrylate, a lactone-modified 2-hydroxypropyl(meth)acrylate and a lactone-modified 2-hydroxybutyl(meth)acrylate.

10. A polymer composition obtained by radical (co)polymerization of an epoxy composition according to claim 1 and optionally at least one vinyl monomer.

11. A polymer composition obtained by radical (co)polymerization of an epoxy composition according to claim 2 and optionally at least one vinyl monomer.

12. A polymer composition obtained by radical (co)polymerization of an epoxy composition according to claim 3 and optionally at least one vinyl monomer.

13. A polymer composition obtained by radical (co)polymerization of an epoxy composition according to claim 4 and optionally at least one vinyl monomer.

14. A polymer composition obtained by radical (co)polymerization of an epoxy composition according to claim 5 and optionally at least one vinyl monomer.

15. A polymer composition obtained by radical (co)polymerization of an epoxy composition according to claim 6 and optionally at least one vinyl monomer.

16. A polymer composition obtained by radical (co)polymerization of an epoxy composition according to claim 7 and optionally at least one vinyl monomer.

17. A polymer composition obtained by radical (co)polymerization of an epoxy composition according to claim 8 and optionally at least one vinyl monomer.

18. A polymer composition obtained by radical (co)polymerization of an epoxy composition according to claim 9 and optionally at least one vinyl monomer.

* * * * *

UNITED STATES PATENT AND TRADEMARK OFFICE
CERTIFICATE OF CORRECTION

PATENT NO.  : 5,510,428
DATED       : April 23, 1996
INVENTOR(S) : Yoshiyuki Harano, et al.

It is certified that error appears in the above-indentified patent and that said Letters Patent is hereby corrected as shown below:

In the abstract, line 12, delete the word "east" and insert therefor -- least --.

Signed and Sealed this

Sixteenth Day of July, 1996

Attest:

BRUCE LEHMAN

Attesting Officer         Commissioner of Patents and Trademarks